(12) United States Patent
Williams et al.

(10) Patent No.: US 11,236,197 B2
(45) Date of Patent: Feb. 1, 2022

(54) MULTI-BLOCK COPOLYMERS

(71) Applicant: IP2IPO Innovations Limited, London (GB)

(72) Inventors: Charlotte Katherine Williams, London (GB); Yunqing Zhu, London (GB)

(73) Assignee: IP2IPO Innovations Limited, London (GB)

( * ) Notice: Subject to any disclaimer, the term of this patent is extended or adjusted under 35 U.S.C. 154(b) by 0 days.

(21) Appl. No.: 15/752,506

(22) PCT Filed: Aug. 12, 2016

(86) PCT No.: PCT/GB2016/052511
§ 371 (c)(1),
(2) Date: Feb. 13, 2018

(87) PCT Pub. No.: WO2017/029479
PCT Pub. Date: Feb. 23, 2017

(65) Prior Publication Data
US 2019/0010277 A1   Jan. 10, 2019

(30) Foreign Application Priority Data

Aug. 14, 2015 (GB) ..................................... 1514506

(51) Int. Cl.
*C08G 63/08* (2006.01)
*C08G 63/82* (2006.01)
(Continued)

(52) U.S. Cl.
CPC .......... *C08G 63/08* (2013.01); *B01J 31/2243* (2013.01); *C08G 63/42* (2013.01); *C08G 63/64* (2013.01);
(Continued)

(58) Field of Classification Search
None
See application file for complete search history.

(56) References Cited

U.S. PATENT DOCUMENTS 4,565,845 A   4/1986 Inoue et al.
4,665,134 A   5/1987 Inoue et al.
(Continued)

FOREIGN PATENT DOCUMENTS

JP   S61-64721 A   4/1986
JP   S62221940 A   9/1987
(Continued)

OTHER PUBLICATIONS

Olsen et al (ε-Decalactone: A Thermoresilient and Toughening Comonomer to Poly(l-lactide), Biomacromolecules 2013, 14, 8, 2883-2890) (Year: 2013).*
(Continued)

*Primary Examiner* — Rachel Kahn
(74) *Attorney, Agent, or Firm* — Wolf, Greenfield & Sacks, P.C.

(57) ABSTRACT

The present invention provides a multi-block copolymer comprising at least blocks A-B-A or B-A-B, wherein block A comprises a polyester formed by polymerisation of a lactone and/or a lactide; and block B comprises a copolyester formed by polymerisation of an epoxide and an anhydride, or a polycarbonate formed by polymerisation of an epoxide and carbon dioxide, and methods of production thereof.

18 Claims, 9 Drawing Sheets

(51) Int. Cl.

| | |
|---|---|
| *B01J 31/22* | (2006.01) |
| *C08G 63/42* | (2006.01) |
| *C08G 63/64* | (2006.01) |
| *C08G 81/02* | (2006.01) |
| *C08G 101/00* | (2006.01) |

(52) U.S. Cl.
CPC ......... *C08G 63/823* (2013.01); *C08G 81/027* (2013.01); *C08G 2101/00* (2013.01); *C08G 2170/00* (2013.01); *C08G 2190/00* (2013.01); *C08G 2390/00* (2013.01)

(56) References Cited

U.S. PATENT DOCUMENTS

| | | | |
|---|---|---|---|
| 5,777,177 | A | 7/1998 | Pazos |
| 9,006,347 | B2 | 4/2015 | Williams et al. |
| 9,453,104 | B2 | 9/2016 | Williams et al. |
| 9,994,675 | B2 | 6/2018 | Williams et al. |
| 10,030,102 | B2 | 7/2018 | Keyworth et al. |
| 10,030,106 | B2 | 7/2018 | Williams et al. |
| 10,308,762 | B2 | 6/2019 | Williams et al. |
| 10,696,797 | B2 | 6/2020 | Williams et al. |
| 2006/0223973 | A1 | 10/2006 | Hinz et al. |
| 2011/0034616 | A1 | 2/2011 | Noordover et al. |
| 2011/0118435 | A1 | 5/2011 | Williams et al. |
| 2012/0136134 | A1 | 5/2012 | Van Der Meulen et al. |
| 2012/0172566 | A1 | 7/2012 | Zhang et al. |
| 2012/0232245 | A1 | 9/2012 | Jeong et al. |
| 2013/0072602 | A1 | 3/2013 | Gürtler et al. |
| 2013/0172524 | A1 | 7/2013 | Farmer |
| 2014/0249279 | A1 | 9/2014 | Williams et al. |
| 2015/0051370 | A1 | 2/2015 | Williams et al. |
| 2016/0108181 | A1 | 4/2016 | Williams et al. |
| 2016/0347906 | A1 | 12/2016 | Williams et al. |
| 2017/0210848 | A1 | 7/2017 | Chapman et al. |
| 2017/0247508 | A1 | 8/2017 | Williams et al. |
| 2018/0148539 | A1 | 5/2018 | Kember et al. |
| 2018/0305501 | A1 | 10/2018 | Williams et al. |

FOREIGN PATENT DOCUMENTS

| | | |
|---|---|---|
| KR | 20140042167 A | 4/2014 |
| RU | 2191784 C2 | 10/2002 |
| WO | WO 2008/128548 A2 | 10/2008 |
| WO | WO 2009/130470 A2 | 10/2009 |
| WO | WO 2009/137540 A1 | 11/2009 |
| WO | WO 2010/028362 A1 | 3/2010 |
| WO | WO 2010/110460 A2 | 9/2010 |
| WO | WO 2012/037282 A2 | 3/2012 |
| WO | WO 2013/034750 A2 | 3/2013 |
| WO | WO 2014/184578 A2 | 11/2014 |
| WO | WO 2016/012785 A1 | 1/2016 |

OTHER PUBLICATIONS

Kroger et al (Alternating Copolymerization of Carbon Dioxide and Cyclohexene Oxide and Their Terpolymerization with Lactide Catalyzed by Zinc Complexes of N,N Ligands, Adv. Synth. Catal. 2006, 348, 1908-1918) (Year: 2006).*
Odian (Principles of Polymerization, Third Edition, Copyright 1991, John Wiley and Sons, pp. 19-23 and 141-149). (Year: 1991).*
Lin et al (Homo- and Block Copolymerizations of e-Decalactone with L-lactide Catalyzed by Lanthanum Compounds, Macromolecules, 2013, 46, 7769-7776). (Year: 2013).*
Langanke et al., Carbon dioxide (CO2) as sustainable feedstock for polyurethane production. Green Chem., 2014;16:1865-1870.
Kim et al., Biodegradable Polycarbonate Synthesis by Copolymerization of Carbon Dioxide with Epoxides Using a Heterogeneous Zinc Complex. Macromol. Symp., 2005;224:181-192. doi:10.1002/masy.200550616.
International Search Report and Written Opinion for PCT/GB2009/001043, dated Jul. 7, 2009.
International Preliminary Report on Patentability for PCT/GB2009/001043, dated Nov. 4, 2010.
International Search Report and Written Opinion for PCT/EP2012/067588, dated Mar. 14, 2013.
International Preliminary Report on Patentability for PCT/EP2012/067588, dated Mar. 20, 2014.
Great Britain Search Report for GB 1308978.4, dated Nov. 14, 2013.
Great Britain Search Report for GB 1402109.1, dated Aug. 1, 2014.
International Search Report and Written Opinion for PCT/GB2014/051511, dated Jan. 20, 2015.
International Preliminary Report on Patentability for PCT/GB2014/051511, dated Nov. 26, 2015.
International Search Report and Written Opinion for PCT/EP2015/052496, dated Apr. 7, 2015.
International Preliminary Report on Patentability for PCT/EP2015/052496, dated Aug. 18, 2016.
International Search Report and Written Opinion for PCT/GB2016/052676, dated Nov. 17, 2016.
[No Author Listed] Database WPI, Thomas Scientific. Univ Pusan Nat Ind Coop Found. Apr. 7, 2014. XP002763970.
Aida et al.., Catalytic reaction on both sides of a metalloporphyrin plane. Alternating copolymerization of phthalic anhydride and epoxypropane with an aluminum porphyrin-quaternary salt system. J Am Chem Soc. 1985;107(5):1358-1364.
Aida et al.., Well-controlled polymerization by metalloporphyrin. Synthesis of copolymer with alternating sequence and regulated molecular weight from cyclic acid anhydride and epoxide catalyzed by the system of aluminum porphyrin coupled with quaternary organic salt. Macromolecules. 1985;18:1049.
Allen et al.., High-activity, single-site catalysts for the alternating copolymerization of CO2 and propylene oxide. J Am Chem Soc. Dec. 4, 2002;124(48):14284-5.
Asato et al.., Polynuclear zinc (II) complexes of phenol-imine and - amine macrocycles. J. Chem. Soc. Dalton Trans. 1995; 3897-3904.
Black et al.., Compartmental Schiff-base ligands as selective double-loaded extractants for copper(II). Chem Commun (Camb). Feb. 21, 2002;(4):340-1.
Bok et al.., Bimetallic fluorine-substituted anilido-aldimine zinc complexes for CO2/(cyclohexene oxide) copolymerization. Inorg Chem. May 15, 2006;45(10):4228-37.
Bradley et al.., Homometallic Alkoxides. Alkoxo and Aryloxo Derivatives of Metals. Elsevier. 2001; 1:105-109.
Buchard et al.., A bimetallic iron(III) catalyst for CO2/epoxide coupling. Chem Commun (Camb). Jan. 7, 2011;47(1):212-4. doi: 10.1039/c0cc02205e. Epub Sep. 27, 2010.
Chamberlain et al.., Polymerization of lactide with zinc and magnesium beta-diiminate complexes: stereocontrol and mechanism. J Am Chem Soc. Apr. 11, 2001;123(14):3229-38.
Cheng et al.., Catalytic Reactions Involving C1 Feedstocks: New High-Activity Zn(II)-Based Catalysts for the Alternating Copolymerization of Carbon Dioxide and Epoxides. J Am Chem Soc. 1998;120:11018-19.
Cheng et al.., Single-site beta-diiminate zinc catalysts for the alternating copolymerization of CO2 and epoxides: catalyst synthesis and unprecedented polymerization activity. J Am Chem Soc. Sep. 12, 2001;123(36):8738-49.
Coates et al.., Discrete Metal-Based Catalyst for the Copolymerization of CO2 and Epoxides: Discovery, Reactivity, Optimization, and Mechanism. Angew Chem Int Ed. 2004;43:6618-39.
Crescenzi et al., Thermodynamics of fusion of poly-β-propiolactone and poly-ϵ-caprolactone. comparative analysis of the melting of aliphatic polylactone and polyester chains. European Polymer Journal Mar. 1972;8(3):449-463.
Cyriac et al.., Immortal CO2/Propylene Oxide Copolymerization: Precise Control of Molecular Weight and Architecture of Various Block Copolymers. Macromolecules. 2010;43(18):7398-401.
Darensbourg et al.., Bis 2,6-difluorophenoxide Dimeric Complexes of Zinc and Cadmium and Their Phosphine Adducts :Lessons Learned Relative to Carbon Dioxide/Cyclohexene Oxide Alternating Copolymerization Processes by Zinc Phenoxides. J Am Chem Soc. 2000;122:12487-96.

(56) References Cited

OTHER PUBLICATIONS

Darensbourg et al.., Catalytic Activity of a Series of ZN(II) Phenoxides for the Copolymerization of Epoxides and Carbon Dioxides. J Am Chem Soc. 1999;121:107-16.

Darensbourg et al.., Kinetic Studies of the Alternating Copolymerization of Cyclic Acid Anhydrides and Epoxides, and the Terpolymerization of Cyclic Acid Anhydrides, Epoxides, and CO2 Catalyzed by (salen)CrIIICl. Macromolecules. 2012;45(5):2242-48.

Darensbourg et al.., Mechanistic aspects of the copolymerization reaction of carbon dioxide and epoxides, using a chiral salen chromium chloride catalyst. J Am Chem Soc. Jun. 5, 2002;124(22):6335-42.

Darensbourg et al.., Solution and solid-state structures of phosphine adducts of monomeric zinc bisphenoxide complexes. Importance of these derivatives in CO2/epoxide copolymerization processes. Inorg Chem. Apr. 3, 2000;39(7):1578-85.

Darensbourg, Making plastics from carbon dioxide: salen metal complexes as catalysts for the production of polycarbonates from epoxides and CO2. Chem Rev. Jun. 2007;107(6):2388-410. Epub Apr. 21, 2007.

Das et al.., Iso- and mixed-valent phenoxy bridged binuclear macrocyclic complexes of cobalt, iron and manganese. Polyhedron. 1994;13(38):2639-45.

Diciccio et al.., Ring-Opening Copolymerization of Maleic Anhydride with Epoxides: A Chain-Growth Approach to Unsaturated Polyesters. J Am Chem Soc. 2011;133:10724-27.

Dutta et al.., Efficient proton-templated synthesis of 18- to 38-membered tetraimino(amino)diphenol macrocyclic ligands: structural features and spectroscopic properties. J Org Chem. Aug. 6, 2004;69(16):5419-27.

Dutta et al.., Model Compounds for Iron Proteins. Structures and Magnetic, Spectroscopic, and Redox Properties of Fe(III)M(II) and [Co(III)Fe(III)](2)O Complexes with (&mgr;-Carboxylato)bis(&mgr;-phenoxo)dimetalate and (&mgr;-Oxo)diiron(III) Cores. Inorg Chem. Apr. 10, 1996;35(8):2292-2300.

Eberhardt et al.., The Ethylsulfinate Ligand: A Highly Efficient Initiating Group for the Zinc β-Diiminate Catalyzed Copolymerization of CO2 and Epoxides. Organometallics. 2003;22:211-14.

Gao et al., Dicarboxylic acid promoted immortal copolymerization for controllable synthesis of low-molecular weight oligo(carbonate-ether) diols with tunable carbonate unit content. J. Polym. Sci. A Polym. Chem. 2012;50:5177-84. doi:10.1002/pola.26366.

Hosseini et al.., Alternating Ring-Opening Polymerization of Cyclohexene Oxide and Anhydrides: Effect of Catalyst, Cocatalyst, and Anhydride Structure. Macromolecules. 2012;45(4):1770-76.

Hosseini et al.., Interaction energy and polymer density profile in nanocomposites: a coarse grain simulation based on interaction stress. Polym Chem. 2012;3:1158-67.

Hosseini et al.., Semi-aromatic polyesters by alternating ring-opening copolymerization of styrene oxide and anhydrides. Polym Chem. Jan. 2012; 3:1308-1313.

Hu et al., Crystalline Structure and Properties of EP and EB Copolymers by Solid-State NMR, DSC, and WAXS. Macromolecules, 2002;35(13):5013-5024. DOI: 10.1021/ma0118670.

Inoue et al.., Copolymerization of carbon dioxide and epoxide. Polymer Letts. 1969;7:287-92.

Inoue et al.., Immortal polymerization: the outset, development, and application. J Polym. Sci. Part A Polym. Chem. 2000;38:2861-71.

Jeske et al.., Alternating copolymerization of epoxides and cyclic anhydrides: an improved route to aliphatic polyesters. J Am Chem Soc. Sep. 19, 2007;129(37):11330-1. Epub Aug. 28, 2007.

Jutz et al.., Mechanistic Investigation and Reaction Kinetics of the Low-Pressure Copolymerization of Cyclohexene Oxide and Carbon Dioxide Catalyzed by a Dizinc Complex. J Am Chem Soc. 2011;133(43):17395-17405.

Keller et al.., Characterization of polybutylacrylate-B-polyvinylpyridine block copolymers by size-exclusion chromatography and dual refractive index/UV-detection. Journal of Liquid Chromatography & Related Technologies, 2010;33(17):1587-1600. DOI: 10.1080/10826076.2010.518934.

Kember et al., Triblock copolymers from lactide and telechelic poly(cyclohexene carbonate) Polym. Chem., Mar. 2, 2012;3:1196-1201 Supporting Information S1-9.

Kember et al.., Di- and tri-zinc catalysts for the low-pressure copolymerization of CO2 and cyclohexene oxide. Inorg Chem. Oct. 5, 2009;48(19):9535-42. doi: 10.1021/ic901109e.

Kember et al.., Di-cobalt(II) catalysts for the copolymerisation of CO2 and cyclohexene oxide: support for a dinuclear mechanism? Chem Sci. 2012;3:1245-55.

Kember et al.., Efficient Magnesium Catalysts for the Copolymerization of Epoxides and CO2; Using Water to Synthesize Polycarbonate Polyols. J Am Chem Soc. 2012;134(38):15676-15679.

Kember et al.., Highly active di- and trimetallic cobalt catalysts for the copolymerization of CHO and CO2 at atmospheric pressure. Macromolecules. 2010; 43(5):2291-98. doi: 10.1021/ma902582m.

Kember et al.., Highly active dizinc catalyst for the copolymerization of carbon dioxide and cyclohexene oxide at one atmosphere pressure. Angew Chem Int Ed Engl. 2009;48(5):931-3.

Kember et al., Triblock copolymers from lactide and telechelic poly(cyclohexene carbonate). Polym Chem. 2012;3:1196-1201.

Knight et al.., Dinuclear zinc complexes using pentadentate phenolate ligands. Inorg Chem. Dec. 15, 2008;47(24):11711-9.

Koning et al.., Synthesis and physical characterization of poly(cyclohexane carbonate), synthesized from CO2 and cyclohexene oxide. Polymer. 2001;42:3995-4004.

Lee et al.., Bimetallic anilido-aldimine zinc complexes for epoxide/CO2 copolymerization. J Am Chem Soc. Mar. 9, 2005;127(9):3031-7.

Lu et al.., Design of highly active binary catalyst systems for CO2/epoxide copolymerization: polymer selectivity, enantioselectivity, and stereochemistry control. J Am Chem Soc. Feb. 8, 2006;128(5):1664-74.

Moore et al.., Mechanism of the alternating copolymerization of epoxides and CO2 using beta-diiminate zinc catalysts: evidence for a bimetallic epoxide enchainment. J Am Chem Soc. Oct. 1, 2003;125(39):11911-24.

Nozaki et al.., Asymmetric catalytic synthesis of polyketones and polycarbonates. Pure Appl Chem. 2004;76(3):541-46.

Paddock et al.., Chemical CO(2) fixation: Cr(III) salen complexes as highly efficient catalysts for the coupling of CO(2) and epoxides. J Am Chem Soc. Nov. 21, 2001;123(46):11498-9.

Pilz et al.., Dinuclear Zinc Complexes Based on Parallel β-Diiminato Binding Sites: Syntheses, Structures, and Properties as CO2/Epoxide Copolymerization Catalysts. Organometallics. 2007;26:3668-76.

Qin et al.., Cobalt-Based Complexes for the Copolymerization of Propylene Oxide and CO2; Active and Selective Catalysts for Polycarbonate Synthesis. Angew Chem Int Ed. 2003;42:5484-87.

Rae et al., The properties of poly(tetrafluoroethylene) (PTFE) in compression. Polymer Oct. 2004;45(22):7615-7625.

Ren et al.., Highly Active, Bifunctional Co(III)-Salen Catalyst for Alternating Copolymerization of CO2 with Cyclohexene Oxide and Terpolymerization with Aliphatic Epoxides. Macromolecules. 2010;43(3):1396-1402.

Robert et al.., Tandem synthesis of alternating polyesters from renewable resources. Nature Comm. 2011;2:586.

Rokicki et al.., The Application of Carbon Dioxide as a Direct Material for Polymer Syntheses in Polymerization and Polycondensation Reactions. J Macromol Sci Rev Macomol Chem Phys 1981;C21(1):135-86.

Saini et al.., Dinuclear metal catalysts: improved performance of heterodinuclear mixed catalysts for CO2-epoxide copolymerization. Chem Commun. 2014;50:4164-67.

Sugimoto et al.., Alternating copolymerization of carbon dioxide and epoxide by dinuclear zinc Schiff base complex. Reactive and Functional Polymers. Nov. 2007; 67(11):1277-83.

Sugimoto et al.., Alternating Copolymerization of Carbon Dioxide and Epoxide by Manganese Porphyrin: The First Example of Polycarbonate Synthesis from 1-atm Carbon Dioxide. J Polym Sci Polym Chem. 2003;41:3549-55.

Sugimoto et al.., Copolymerization of Carbon Dioxide and Epoxide. J Polym Sci Polym Chem. 2004;42:5561-73.

(56) References Cited

OTHER PUBLICATIONS

Sugimoto et al.., The Cobalt Porphyrin-Lewis Base System: A Highly Selective Catalyst for Alternating Copolymerization of CO2 and Epoxide under Mild Condition. Macromolecules. 2008;41:312-17.

Van Meerendonk et al.., High-Throughput Automated Parallel Evaluation of Zinc-Based Catalysts for the Copolymerization of CHO and CO2 to Polycarbonates. Macromol Rapid Commun. 2004;25:382-86.

Van Meerendonk et al.., Unexpected Side Reactions and Chain Transfer for Zinc-Catalyzed Copolymerization of Cyclohexene Oxide and Carbon Dioxide. Macromolecules. 2005;38:7306-13.

Williams et al.., A highly active zinc catalyst for the controlled polymerization of lactide. J Am Chem Soc. Sep. 17, 2003;125(37):11350-9.

Williams et al.., Metalloenzyme inspired dizinc catalyst for the polymerization of lactide. Chem Commun (Camb). Sep. 21, 2002;(18):2132-3.

Wu et al.., Tandem metal-coordination copolymerization and organocatalytic ring-opening polymerization via water to synthesize diblock copolymers of styrene oxide/CO2 and lactide. J Am Chem Soc. Oct. 24, 2012;134(42):17739-45. doi: 10.1021/ja307976c. Epub Oct. 9, 2012.

Xiao et al., Copolymerization of cyclohexene oxide with CO2 by using intramolecular dinuclear zinc catalysts. Chemistry. Jun. 6, 2005;11(12):3668-78.

Xiao et al.., Intramolecularly Dinuclear Magnesium Complex Catalyzed Copolymerization of Cyclohexene Oxide with CO2 under Ambient CO2 Pressure: Kinetics and Mechanism. Macromolecules. 2006;39:128-37.

\* cited by examiner

MULTI-BLOCK COPOLYMERS

RELATED APPLICATIONS

This application is a national stage filing under 35 U.S.C. § 371 of international PCT application, PCT/GB2016/052511, filed Aug. 12, 2016, which claims priority under 35 U.S.C. § 119(a) or 35 U.S.C. § 365(b) to British application number, GB 1514506.3, filed Aug. 14, 2015, each of which is incorporated herein by reference.

FIELD OF THE INVENTION

The present invention relates to multi-block copolymers and methods of production thereof.

BACKGROUND

Thermoplastic elastomers (TPE), also known as thermoplastic rubbers, are a class of block copolymers which consist of different polymer blocks with both thermoplastic and elastomeric properties. The fundamental difference between thermoset and thermoplastic elastomers is the type of the cross-linking points which contribute to high elastic properties. The polystyrene-b-polybutadiene-b-polystyrene (SBS), which is composed of polymer blocks of conjugated diene monomer (butadiene) and vinyl aromatic monomer (styrene), is considered the most successfully commercialized thermoplastic elastomer. However, SBS and its derivatives are non-degradable and the raw materials are currently acquired from fossil oil. In terms of manufacturing, due to the fact that there are carbon double bonds in each repeat unit of the polybutadiene block. SBS and its derivative undergo thermal crosslinking reactions at high temperature. This results in increasing viscosity during processing and ultimately jeopardises the high elastic property owing to over-high crosslinking density.

There has been commercially successful copolyester elastomers, such as Hytrel, a trademarked product of DuPont Company in the United States, which has been used to make solid tires and other automotive parts. Conventionally, this kind of copolyester elastomers usually consist of polybutylene terephthalate (PBT, as the hard crystalline domain) and any one of a wide range of polyesters or polyethers as the soft/flexible matrix, such as polytetramethylene ether glycol. However, the preparation of PBT relies on a multi-step polycondensation reactions, which are very slow (low polymerization rate) and energy consuming processes. Also, when polyethers are chosen to be the soft/flexible domain, the copolyester elastomers are hardly degradable (e.g. Hytrel).

The present invention relates to multi-block copolymers with tailorable elastomeric properties and degradable backbones, as an alternative to SBS and its derivatives.

SUMMARY OF THE INVENTION

In a first aspect, the invention provides a multi-block copolymer comprising at least blocks A-B-A or B-A-B, wherein block A comprises a polyester formed by polymerisation of a lactone and/or a lactide; and block B is comprises copolyester formed by polymerisation of an epoxide and an anhydride, or a polycarbonate formed by polymerisation of an epoxide and carbon dioxide, wherein the multi-block copolymer is characterised by one or more of features (i) to (iii):

(i) a degree of crystallinity ($\chi$) of block A of no more than 20% as determined by DSC; and/or
(ii) a degree of crystallinity ($\chi$) of block A of no more than 20% as determined by WAXS; and/or
(iii) a measureable $T_g$ for each of blocks A and B, with a difference of at least 10° C. between the $T_g$ for blocks A and B.

In a second aspect, the invention provides a 'one-pot' method for producing a multi-block copolymer comprising blocks A-B-A or B-A-B, wherein block A comprises a polyester formed by polymerisation of a lactone and/or a lactide; and block B is comprises copolyester formed by polymerisation of an epoxide and an anhydride, or a polycarbonate formed by polymerisation of an epoxide and carbon dioxide, wherein the method comprises forming a reaction mixture comprising:
i. an epoxide;
II. an anhydride or carbon dioxide; and
iii. a lactone and/or a lactide; and
iv. a catalytic system comprising a catalyst of formula (I) and an initiator;
such that polymerisation occurs to form a multi-block copolymer comprising blocks A-B-A or B-A-B,
wherein the catalyst is of formula (I):

wherein:
[M] is a metal complex having at least one metal atom M coordinated by a ligand system;
M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-,
each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;
X is C or S
R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate; and
wherein the initiator is a multifunctional protic compound comprising at least two moieties independently selected from —OH, —SH, —C(O)OH or —NH—, or wherein the initiator is water.

In a third aspect, the invention provides a method for producing a multi-block copolymer comprising blocks A-B-A or B-A-B, wherein block A comprises a polyester formed by polymerisation of a lactone and/or a lactide; and block B is comprises copolyester formed by polymerisation of an epoxide and an anhydride, or a polycarbonate formed by polymerisation of an epoxide and carbon dioxide, wherein the multi-block copolymer is characterised by one or more of features (i) to (iii): (i) a degree of crystallinity ($\chi$) of block A of no more than 20% as determined by DSC; and/or (ii) a degree of crystallinity ($\chi$) of block A of no more than 20% as determined by WAXS; and/or (iii) a measureable $T_g$ for each of blocks A and B, with a difference of at least 10° C. between the $T_g$ for blocks A and B, wherein the method comprises forming a reaction mixture comprising:

(a) forming a first block A or B by polymerizing first monomer or combination of monomers selected from
(i). an epoxide and an anhydride;
(ii). an epoxide and carbon dioxide; and
(iii). a lactone and/or a lactide;
by contacting the monomer or combination of monomers in a reaction mixture with a catalytic system comprising a catalyst of formula (I) and an initiator;
(b) forming a multi-block copolymer comprising blocks A-B-A or B-A-B by adding second monomer or combination of monomers to the reaction mixture, wherein if the first monomer is (i) or (ii), the second monomer is (iii) and if the first monomer is a (iii), the second monomer is (i) or (ii) such that polymerisation occurs to form a multi-block copolymer comprising blocks A-B-A or B-A-B, wherein the catalyst is of formula (I):

(I)

wherein:
[M] is a metal complex having at least one metal atom M coordinated by a ligand system; M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-,
each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;
X is C or S
R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate; and
wherein the initiator is a multifunctional protic compound comprising at least two moieties independently selected from —OH, —SH, —C(O)OH or —NH—, or wherein the initiator is water.

In a fourth aspect of the invention, there is provided a polymer obtainable from the method according to the third aspect of the invention.

In a fifth aspect of the invention, there is provided a polymer of the first, second or fourth aspects of the invention for use as a packaging material, a biomedical material, a sealant, an adhesive, an engineering material or the like.

DETAILED DESCRIPTION

Figure 1:
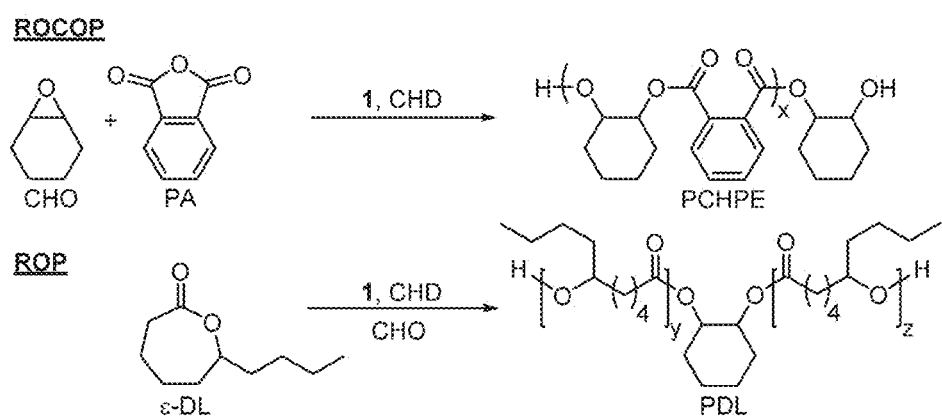
FIG. 1 illustrates ROCOP and ROP reactions catalysed by complex 1.

The invention relates to multi-block copolymers which are capable of providing thermoplastic elastomeric properties. The multi-block copolymers may comprise a polyester or polycarbonate, which is preferably rigid and amorphous domain, either dispersing in a soft/flexible polyester matrix or forming a bicontinous nanostructure with the soft/flexible polyester domain. Accordingly, the multi-block copolymers of the invention may comprise a phase separated nanostructure, resulting in them being thermoplastics that have the rubber-like elasticity but can also be molded and remolded like plastics.

The inventors have surprisingly found that it is possible to produce multi-block copolymers comprising, using a single catalytic system, either by the subsequent addition of monomer, or by a "one-pot" method in which all of the monomers are present in the reaction mixture at the start of the reaction.

Various terms as used herein are as defined below.

For the purpose of the invention, an aliphatic group is a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups, and combinations thereof. An aliphatic group is preferably a $C_{1-20}$aliphatic group, that is an aliphatic group with 1, 2, 3, 4, 5, 6, 7, 8, 9, 10, 11, 12, 13, 14, 15, 16, 17, 18, 19 or 20 carbon atoms. Preferably, an aliphatic group is a $C_{1-15}$aliphatic, more preferably a $C_{1-12}$aliphatic, more preferably a $C_{1-10}$aliphatic, even more preferably a $C_{1-8}$aliphatic, such as a $C_{1-6}$aliphatic group.

An alkyl group is preferably a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Preferably, an alkyl group is a $C_{1-15}$alkyl, preferably a $C_{1-12}$alkyl, more preferably a $C_{1-10}$alkyl, even more preferably a $C_{1-8}$alkyl, even more preferably a $C_{1-6}$alkyl group. In certain embodiments, an alkyl group is a "$C_{1-6}$ alkyl group", that is an alkyl group that is a straight or branched chain with 1 to 6 carbons. The alkyl group therefore has 1, 2, 3, 4, 5 or 6 carbon atoms. Specifically, examples of "$C_{1-20}$ alkyl group" include methyl group, ethyl group, n-propyl group, isopropyl group, n-butyl group, iso-butyl group, sec-butyl group, tert-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like. Alkenyl and alkynyl groups are preferably "$C_{2-20}$alkenyl" and "$C_{2-20}$alkynyl" respectively, that is an alkenyl or alkynyl group which is a straight chain or branched chain with 2 to 20 carbons. The alkenyl or alkynyl group therefore has 2, 3, 4, 5, 6, 7, 8, 9, 10, 11, 12, 13, 14, 15, 16, 17, 18, 19 or 20 carbon atoms. Preferably, an alkenyl group or an alkynyl group is "$C_{2-15}$alkenyl" and "$C_{2-15}$alkynyl", more preferably "$C_{2-12}$alkenyl" and "$C_{2-12}$alkynyl", even more preferably "$C_{2-10}$alkenyl" and "$C_{2-10}$alkynyl", even more preferably "$C_{2-8}$alkenyl" and "$C_{2-8}$alkynyl", most preferably "$C_{2-6}$alkenyl" and "$C_{2-6}$alkynyl" groups respectively.

A heteroaliphatic group is an aliphatic group as described above, which additionally contains one or more heteroatoms. Heteroaliphatic groups therefore preferably contain from 2 to 21 atoms, preferably from 2 to 16 atoms, more preferably from 2 to 13 atoms, more preferably from 2 to 11 atoms, more preferably from 2 to 9 atoms, even more preferably from 2 to 7 atoms, wherein at least one atom is a carbon atom. Particularly preferred heteroatoms are selected from O, S, N, P and Si. When heteroaliphatic groups have two or more heteroatoms, the heteroatoms may be the same or different.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH₂—cyclohexyl.

Cycloalkyl, cycloalkenyl and cycloalkynyl groups have from 3 to 20 carbon atoms. The cycloalkyl, cycloalkenyl and cycloalkynyl groups therefore have 3, 4, 5, 6, 7, 8, 9, 10, 11, 12, 13, 14, 15, 16, 17, 18, 19 or 20 carbon atoms. Cycloalkyl, cycloalkenyl and cycloalkynyl groups preferably have from 3 to 15, more preferably from 3 to 12, even more preferably from 3 to 10, even more preferably from 3 to 8 carbon atoms. When an alicyclic group has from 3 to 8 carbon atoms, this means that the alicyclic group has 3, 4, 5, 6, 7 or 8 carbon atoms. Specifically, examples of the $C_{3-20}$ cycloalkyl group include cyclopropyl, cyclobutyl, cyclopentyl, cyclohexyl, cycloheptyl, adamantyl and cyclooctyl. A heteroalicyclic group is an alicyclic group as defined above which has, in addition to carbon atoms, one or more ring heteroatoms, which are preferably selected from O, S, N, P and Si. Heteroalicyclic groups preferably contain from one to four heteroatoms, which may be the same or different. Heterocyclic groups preferably contain from 4 to 20 atoms, more preferably from 4 to 14 atoms, even more preferably from 4 to 12 atoms.

An aryl group is a monocyclic or polycyclic ring system having from 5 to 20 carbon atoms. An aryl group is preferably a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, naphthyl group or azulenyl group and the like. It should be noted that condensed rings such as indan and tetrahydro naphthalene are also included in the aryl group.

A heteroaryl group is an aryl group having, in addition to carbon atoms, from one to four ring heteroatoms which are preferably selected from O, S, N, P and Si. A heteroaryl group preferably has from 5 to 20, more preferably from 5 to 14 ring atoms. Specifically, examples of a heteroaryl group include pyridine, imidazole, N-methylimidazole and 4-dimethylaminopyridine.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide" or "halogen" are used interchangeably and, as used herein mean a fluorine atom, a chlorine atom, a bromine atom, an iodine atom and the like, preferably a fluorine atom, a bromine atom or a chlorine atom, and more preferably a fluorine atom or a bromine atom.

A haloalkyl group is preferably a "$C_{1-20}$ haloalkyl group", more preferably a "$C_{1-15}$ haloalkyl group", more preferably a "$C_{1-12}$ haloalkyl group", more preferably a "$C_{1-10}$ haloalkyl group", even more preferably a "$C_{1-8}$ haloalkyl group", even more preferably a "$C_{1-6}$ haloalkyl group" and is a $C_{1-20}$ alkyl, a $C_{1-15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, preferably 1, 2 or 3 halogen atom(s). Specifically, examples of "$C_{1-20}$ haloalkyl group" include fluoromethyl group, difluoromethyl group, trifluoromethyl group, fluoroethyl group, difluoroethyl group, trifluoroethyl group, chloromethyl group, bromomethyl group, iodomethyl group and the like.

An alkoxy group is preferably a "$C_{1-20}$ alkoxy group", more preferably a "$C_{1-15}$ alkoxy group", more preferably a "$C_{1-12}$ alkoxy group", more preferably a "$C_{1-10}$ alkoxy group", even more preferably a "$C_{1-8}$ alkoxy group", even more preferably a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group"

include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-heptyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An alkylthio group is preferably a "$C_{1-20}$ alkylthio group", more preferably a "$C_{1-15}$ alkylthio group", more preferably a "$C_{1-12}$ alkylthio group", more preferably a "$C_{1-10}$ alkylthio group", even more preferably a "$C_{1-8}$ alkylthio group", even more preferably a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively.

An alkylaryl group can comprise any of the alkyl or aryl groups discussed above.

Preferably the alkylaryl group is a "$C_{6-12}$ aryl $C_{1-20}$ alkyl group", more preferably a preferably a "$C_{6-12}$ aryl $C_{1-16}$ alkyl group", even more preferably a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, preferably, the alkylaryl group is —CH$_2$-Ph or —CH$_2$CH$_2$-Ph. An alkylaryl group can also be referred to as "aralkyl".

An alkylheteroaryl group can comprise any of the alkyl or heteroaryl groups discussed above. Preferably the alkylheteroaryl group is a "heteroaryl $C_{1-20}$ alkyl group", more preferably a preferably a "heteroaryl $C_{1-16}$ alkyl group", even more preferably a "heteroaryl $C_{1-6}$ alkyl group" and is a heteroaryl group as defined above bonded at any position to an alkyl group as defined above. The point of attachment of the alkylheteroaryl group to a molecule may be via the alkyl portion. An alkylheteroaryl group can also be referred to as "heteroaralkyl".

An ether group is preferably a group OR$_6$ wherein R$_6$ can be an aliphatic, heteroaliphatic, alicyclic, heteroalicyclic, aryl or heteroaryl group as defined above. In certain embodiments, R$_6$ can be an unsubstituted aliphatic, alicyclic or aryl. Preferably, R$_6$ is an alkyl group selected from methyl, ethyl or propyl. A thioether group is preferably a group SR$_6$ wherein R$_6$ is as defined above.

A silyl group is preferably a group —Si(R$_7$)$_3$, wherein each R$_7$ can be independently an aliphatic, heteroaliphatic, alicyclic, heteroalicyclic, aryl or heteroaryl group as defined above. In certain embodiments, each R$_7$ is independently an unsubstituted aliphatic, alicyclic or aryl. Preferably, each R$_7$ is an alkyl group selected from methyl, ethyl or propyl. A silyl ether group is preferably a group OSi(R$_8$)$_3$ wherein each R$_8$ can be independently an aliphatic, heteroaliphatic, alicyclic, heteroalicyclic, aryl or heteroaryl group as defined above. In certain embodiments, each R$_8$ can be independently an unsubstituted aliphatic, alicyclic or aryl. Preferably, each R$_8$ is an alkyl group selected from methyl, ethyl or propyl.

A nitrile group is a group CN.

An azide group is a group —N$_3$.

An imine group is a group —CRNR, preferably a group —CHNR$_9$ wherein R$_9$ is an aliphatic, heteroaliphatic, alicyclic, heteroalicyclic, aryl or heteroaryl group as defined above. In certain embodiments, R$_9$ is unsubstituted aliphatic, alicyclic or aryl. Preferably R$_9$ is an alkyl group selected from methyl, ethyl or propyl.

An acetylide group contains a triple bond —C≡C—R$_{10}$, preferably wherein R$_{10}$ can be an aliphatic, heteroaliphatic, alicyclic, heteroalicyclic, aryl or heteroaryl group as defined above. For the purposes of the invention when R$_{10}$ is alkyl, the triple bond can be present at any position along the alkyl chain. In certain embodiments, R$_{10}$ is unsubstituted aliphatic, alicyclic or aryl. Preferably R$_{10}$ is methyl, ethyl, propyl or phenyl. An amino group is preferably —NH$_2$, —NHR$_{11}$ or —N(R$_{11}$)$_2$ wherein R$_{11}$ can be an aliphatic, heteroaliphatic, alicyclic, heteroalicyclic, a silylalkyl, aryl or heteroaryl group as defined above. It will be appreciated that when the amino group is N(R$_{11}$)$_2$, each R$_{11}$ group can be independently selected from an aliphatic, heteroaliphatic, alicyclic, heteroalicyclic a silylalkyl group, heteroaryl or an aryl group as defined above. In certain embodiments, each R$_{11}$ is independently an unsubstituted aliphatic, alicyclic or aryl. Preferably R$_{11}$ is methyl, ethyl, propyl, SiMe$_3$ or phenyl. Where W of the chain transfer agent is amine, the amine is preferably NH$_2$ or NHR$_{11}$.

An alkylamino group may be a group —NHR$_{11}$ or —N(R$_{11}$)$_2$ as defined above.

An amido group is preferably —NR$_{12}$C(O)— or —C(O)—NR$_{12}$— wherein R$_{12}$ can be hydrogen, an aliphatic, heteroaliphatic, alicyclic, heteroalicyclic, aryl or heteroaryl group as defined above. In certain embodiments, R$_{12}$ is unsubstituted aliphatic, alicyclic or aryl. Preferably R$_{12}$ is hydrogen, methyl, ethyl, propyl or phenyl.

An ester group is preferably —OC(O)R$_{13}$— or —C(O)OR$_{13}$— wherein R$_{13}$ can be hydrogen, an aliphatic, heteroaliphatic, alicyclic, heteroalicyclic, aryl or heteroaryl group as defined above. In certain embodiments, R$_{13}$ is unsubstituted aliphatic, alicyclic or aryl. Preferably R$_{13}$ is hydrogen, methyl, ethyl, propyl or phenyl.

A sulfoxide is preferably —SOR$_{14}$, a sulfonate group is preferably —OS(O)$_2$R$_{14}$, a sulfinate group is preferably —S(O)O—R$_{14}$, wherein R$_{14}$ can be hydrogen, an aliphatic, heteroaliphatic, alicyclic, heteroalicyclic, aryl or heteroaryl group as defined above. In certain embodiments, R$_{14}$ is unsubstituted aliphatic, alicyclic or aryl. Preferably R$_{14}$ is hydrogen, methyl, ethyl, propyl or phenyl.

A carboxylate group is preferably OC(O)R$_{15}$, wherein R$_{15}$ can be hydrogen, an aliphatic, heteroaliphatic, alicyclic, heteroalicyclic, aryl or heteroaryl group as defined above. In certain embodiments, R$_{15}$ is unsubstituted aliphatic, alicyclic or aryl. Preferably R$_{15}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is preferably MeC(O)N(R$_{16}$)$_2$ wherein R$_{16}$ can be hydrogen, an aliphatic, heteroaliphatic, alicyclic, heteroalicyclic, aryl or heteroaryl group as defined above. In certain embodiments, R$_{16}$ is unsubstituted aliphatic, alicyclic or aryl. Preferably R$_{16}$ is hydrogen, methyl, ethyl, propyl or phenyl.

A phosphinate group is preferably a group —OP(O)(R$_{17}$)$_2$ wherein each R$_{17}$ is independently selected from hydrogen, or an aliphatic, heteroaliphatic, alicyclic, heteroalicyclic, aryl or heteroaryl group as defined above. In certain embodiments, $R_{17}$ is aliphatic, alicyclic or aryl, which are optionally substituted by aliphatic, alicyclic, aryl or $C_{1-6}$alkoxy. Preferably $R_{17}$ is optionally substituted aryl or $C_{1-20}$ alkyl, more preferably phenyl optionally substituted by $C_{1-6}$alkoxy (preferably methoxy) or unsubstituted $C_{1-20}$alkyl (such as hexyl, octyl, decyl, dodecyl, tetradecyl, hexadecyl, stearyl).

It will be appreciated that where any of the above groups are present in a Lewis base G, one or more additional $R^G$ groups may be present, as appropriate, to complete the valency. For example, in the context of an ether an additional $R^G$ group may be present to give $R^G OR_6$, wherein $R^G$ is hydrogen, an optionally substituted aliphatic, heteroaliphatic, alicyclic, heteroalicyclic, aryl or heteroaryl group as defined above. Preferably, $R^G$ is hydrogen or aliphatic, alicyclic or aryl.

Any of the aliphatic, heteroaliphatic, alicyclic, heteroalicyclic, aryl, heteroaryl, haloalkyl, alkoxy, alkylthio, alkylaryl, ether, ester, sulfoxide, sulfonate, sulfinate, carboxylate, silyl ether, imine, acetylide, amino, alkylamino, phosphinate or amido groups wherever mentioned in the definitions above, may optionally be substituted by halogen, hydroxyl, nitro, carbonate, alkoxy, aryloxy, heteroaryloxy, amino, alkylamino, imine, nitrile, acetylide, or optionally substituted aliphatic, heteroaliphatic, alicyclic, heteroalicyclic, aryl or heteroaryl groups (for example, optionally substituted by halogen, hydroxyl, nitro, carbonate, alkoxy, amino, alkylamino, imine, nitrile or acetylide).

The term epoxide therefore relates to any compound comprising an epoxide moiety.

The term anhydride relates to any compound comprising an anhydride moiety in a ring system (i.e. a cyclic anhydride).

The term lactone relates to any cyclic compound comprising a —C(O)O— moiety in the ring.

The term lactide is a cyclic compound containing two ester groups.

The term "lactone and/or lactide" used herein encompasses a lactone, a lactide and a combination of a lactone and a lactide. Preferably, the term "lactone and/or lactide" means a lactone or a lactide.

An "initiator" as referred to herein acts in a method of the invention as a chain transfer agent and may therefore alternatively be referred to as a chain transfer agent (CTA). The chain transfer agent is a compound comprising at two moieties independently selected from —OH, —SH, —C(O)OH or —NH—, or water. For example, the CTA may be a compound of formula (II):

$$Y(-W)_n \qquad (II)$$

wherein Y is the core of the chain transfer agent and may be any group which can have one or more, preferably two or more "W" groups attached to it an optionally substituted moiety selected from the group consisting of aliphatic, heteroaliphatic, alicyclic, heteroalicyclic, aryl, heteroaryl, polyolefin, polyester, polyether, polycarbonate or combinations thereof; each W is independently selected from hydroxyl (—OH), amine (—$NHR^W$), thiol (—SH) or carboxylate (—C(O)OH), wherein $R^W$ is hydrogen, optionally substituted aliphatic, heteroaliphatic, alicyclic, heteroalicyclic, aryl or heteroaryl, or combinations thereof (i.e. aliphaticaryl, aliphaticheteroaryl, heteroaliphaticaryl, etc); and n is an integer which is at least 2. In preferred embodiments, n is an integer selected from 2 to 10 inclusive (i.e. n can be 2, 3, 4, 5, 6, 7, 8, 9 or 10), preferably from 2 to 10 inclusive. More preferably, n is an integer from 2 to 6 inclusive. In some embodiments, Y is an optionally substituted moiety selected from the group consisting of aliphatic, heteroaliphatic, alicyclic, heteroalicyclic, aryl, heteroaryl, polyolefin, polyester, polyether, polycarbonate or combinations thereof. For example, Y may be an optionally substituted araliphatic, heteroaraliphatic, aliphaticalicyclic etc. group. Preferably Y is selected from alkyl, heteroalkyl, alkenyl, heteroalkenyl, alkynyl, heteroalkynyl, cycloalkyl, heterocycloalkyl, aryl, heteroaryl and polyether. The group Y may optionally be substituted. In certain embodiments, Y is optionally substituted by halogen, nitrile, imine, nitro, aliphatic, acetyl, amido, heteroaliphatic, alicyclic, heteroalicyclic, aryl or heteroaryl. It will be appreciated that water, which does not have two distinct "—OH" groups, displays similar chain transfer properties to molecules which do have two distinct "—OH" groups.

When Y is a polymer (i.e. when Y comprises a polyolefin, polyester, polyether or polycarbonate group), the molecular weight ($M_n$) of such polymers are preferably less than 10,000 g/mol. Preferred polymers include poly(ethylene glycol) (PEG) and poly(lactic acid) (PLA).

In certain embodiments, each occurrence of W may be the same or different. In other embodiments, each occurrence of W is hydroxyl (i.e. the chain transfer agent is a polyol, for example a diol, a triol, a tetraol etc.). In other embodiments, each occurrence of W is amine (i.e. the chain transfer agent is a polyamine, for example a diamine, a triamine, a tetraamine etc.). In other embodiments, each occurrence of W is carboxylic acid (i.e. the chain transfer agent is a polycarboxylic acid, for example a diacid, a triacid, a tetraacid etc.). In other embodiments, each occurrence of W is thiol (i.e. the chain transfer agent is a polythiol, for example a dithiol, a trithiol, a tetrathiol etc.). In other embodiments, the chain transfer agent is water.

A single chain transfer agent or a mixture of chain transfer agents may be used.

Examples of chain transfer agents useful in the present invention include water, diols (for example, 1,2-ethanediol, 1-2-propanediol, 1,3-propanediol, 1,2-butanediol, 1-3-butanediol, 1,4-butanediol, 1,5-pentanediol, 1,6-hexanediol, 1,2-diphenol, 1,3-diphenol, 1,4-diphenol, catechol and cyclohexanediol), triols (glycerol, benzenetriol, 1,2,4-butanetriol, tris(methylalcohol)propane, tris(methylalcohol)ethane, tris(methylalcohol)nitropropane, preferably glycerol or benzenetriol), tetraols (for example, calix[4]arene, 2,2-bis(methylalcohol)-1,3-propanediol, preferably calix[4]arene), polyols (for example, D-(+)-glucose or D-sorbitol), dihydroxy terminated polyesters (for example polylactic acid), dihydroxy terminated polyethers (for example poly(ethylene glycol)), starch, lignin, diamines (for example 1,4-butanediamine), triamines, diamine terminated polyethers, diamine terminated polyesters, dicarboxylic acids (for example, maleic acid, malonic acid, succinic acid, glutaric acid or terephthalic acid, preferably maleic acid, malonic acid, succinic acid, glutaric acid), tricarboxylic acids (for example, citric acid, 1,3,5-benzenetricarboxylic acid or 1,3, 5-cyclohexanetricarboxylic acid, preferably citric acid), mono-thiols, dithoils, trithiols, and compounds having a mixture of hydroxyl, amine, carboxylic acid and thiol groups, for example lactic acid, glycolic acid, 3-hydroxypropionic acid, natural amino acids, unnatural amino acids, monosaccharides, disaccharides, oligosaccharides and polysaccharides (including pyranose and furanose forms). In certain embodiments, the chain transfer agent is selected from cyclohexene diol, 1,2,4-butanetriol, tris(methylalcohol)propane, tris(methylalcohol)nitropropane, tris(methylalcohol)ethane, 2,2-bis(methylalcohol)-1,3-propanediol, 1,3,
5-benzenetricarboxylic acid, diphenylphosphinic acid, 1,3,
5-cyclohexanetricarboxylic acid, 1,4-butanediamine, 1,6-
hexanediol, D-sorbitol, 1-butylamine, terephthalic acid,
D-(+)-glucose, 3,5-di-tert-butylbenzoic acid, 4-ethylbenze-
nesulfonic acid and water.

Crystallinity ($\chi$) of block A may be calculated using the DSC procedure described herein. If the polymer sample contains any crystalline material a melting peak is observed. If no melting peak is observed crystallinity is assumed at zero percent. If a melting point is observed, crystallinity may be calculated via the following equation:

$$X = \frac{\Delta H_m}{\Delta H_m^o} \times 100\%$$

Where $\Delta H_m$ is the integral of the melting peak using the integral function provided in the software (universal analysis, version 4.3A), with the unit of J/g; $\Delta H_m^o$ is the amount of heat when 1 gram of 100% crystallized polylactone or polylactide is melted with the unit of J/g. The value of $\Delta H_m^o$ can be calculated by the extrapolation of the $\Delta H_m$ of polylactone or polylactide standards (with known crystallinity) to complete crystallinity. The $\Delta H_m$ values of different polylactone or polylactide standards are plotted against the crystallinity ($\chi$) of these standards. Then the plots are extrapolated to a crystallinity of 100%, where the corresponding $\Delta H_m$ value is defined as the $\Delta H_m^o$. In some instances, the value of $\Delta H_m^o$ can be found in literature (Crescenzi. V, G. Manzini, Calzolari. G and C. Borri, Eur. Polym. J., 1972, 8, 449).

Alternatively, crystallinity ($\chi$) may be determined using a wide-angle X-ray scattering (WAXS) procedure as described in W. Hu et al., *Macromolecules* 2002, 35, 5013-5024 or P. J. Rae et al, *Polymer* 2004, 45, 7615-7625, the contents of which are incorporated herein by reference. CuK$\alpha$($\lambda$=0.154 nm) X-ray is produced by a rotating anode X-ray generator (e.g. Rigaku ROTAFLEX RTP300) with a Cu target and a Ni filter. The goniometer was calibrated with NaCl to within 0.5°. Polymer samples are continuously scanned from 4 to 50° (or corresponding vector q) at a rate of 1 deg·min$^{-1}$. The X-ray data were first modelled using a form which include Lorentzian line shapes for the crystalline peaks and a lorentzian plus a quadratic form for the amorphous scattering. Then, the data were fit using the CPLOT nonlinear least-squares fitting routine over the scattering range. The crystallinity ($\chi$) is calculated by this equation:

$$\chi = A_c / A_a \times 100\%$$

where $A_a$ is the integral of the amorphous contribution and $A_c$ is the integral of the crystalline peaks.

In a first aspect, the invention provides a multi-block copolymer comprising at least blocks A-B-A or B-A-B, wherein block A comprises a polyester formed by polymerisation of a lactone and/or a lactide; and block B comprises a copolyester formed by polymerisation of an epoxide and an anhydride, or a polycarbonate formed by polymerisation of an epoxide and carbon dioxide, wherein the multi-block copolymer is characterised by one or more of features (i) to (iii):
(i) a degree of crystallinity ($\chi$) of block A of no more than 20% as determined by DSC; and/or
(ii) a degree of crystallinity ($\chi$) of block A of no more than 20% as determined by WAXS; and/or
(iii) a measureable $T_g$ for each of blocks A and B, with a difference of at least 10° C. between the $T_g$ for blocks A and B.

In some embodiments, the multi-block copolymer has a measureable $T_g$ for each of blocks A and B, with a difference of at least 10° C. between the $T_g$ for blocks A and B. Preferably, there is a difference of at least 20° C., at least 40° C., at least 60° C., at least 80° C. or at least 100° C. between the T for blocks A and B.

Block B may have a $T_g$ of ≥30° C., ≥40° C., or ≥50° C. In some embodiments, the $T_g$ of block B is no more than 250° C., no more than 200° C., no more than 150° C. or no more than 100° C. In some embodiments, block B has a $T_g$ of 50° C. to 70° C. From the processing perspective, where $T_g$ is below 100° C., processing can be conducted at much lower temperatures than 200° C.

Block B of the multi-block copolymer is preferably substantially amorphous. Block B is considered to be substantially amorphous in the absence of detectable crystalline component therein. Block B may, for example, be determined to be substantially amorphous if no melting peaks can be observed in DSC or no sharp crystalline peaks can be observed in WAXS, utilising DSC and WAXS procedures corresponding to those as defined herein.

In a preferred embodiment, the multi-block copolymer is characterised by feature (i) or (ii) and feature (iii).

In some embodiments, the degree of crystallinity ($\chi$) of block A is no more than 20%, no more than 15%, no more than 10% or no more than 5%, as determined by DSC.

In some embodiments, the degree of crystallinity ($\chi$) of block A is no more than 20%, no more than 15%, no more than 10% or no more than 5%, as determined by WAXS.

It will be appreciated that the polyester of block A and the copolyester or polycarbonate of block B may be directly or indirectly linked. For example, blocks A and B of a multi-block copolymer of the invention may be directly linked, or the multi-block copolymer may comprise linker groups and/or additional polymeric groups between blocks A and B.

Additional polymeric groups may, for example, be a polyester formed by polymerisation of a lactone and/or a lactide, a copolyester formed by polymerisation of an epoxide and an anhydride, or a polycarbonate formed by polymerisation of an epoxide and carbon dioxide, as described herein for any embodiment of block A or B. In addition, the multi-block copolymer may comprise more than the three blocks A-B-A or B-A-B. For example, the multiblock copolymer may comprise 5, 7 or more alternating blocks, such as A-B-A-B-A or A-B-A-B-A-B-A. Alternatively, the multi-block copolymer may comprise two or more linked triblock units A-B-A or B-A-B, for example in the form A-B-A-A-B-A or B-A-B-B-A-B. The blocks A-B-A or B-A-B may be linked via a linker, for example a urethane linker. Alternatively, the multi-block copolymer may be comprise block in the form A-B-B-B-A or B-A-A-A-B, wherein adjacent A or B blocks may be distinct in identity and/or linked indirectly via a linker.

Within a multi-block copolymer of the invention, the weight content of block B, with reference to block A, may be from 10 to 90 wt %, preferably 20 to 80 wt %, more preferably 30 to 55 wt % or 30 to 50 wt %. The weight contents were calculated via the following equation:

$$\text{wt \%} = M_B / (a \times M_A + M_B) \times 100\%$$

where a is the molar ratio of the repeat units of blocks A and B, acquired from $^1$H NMR (a=[m-A]/[m-B]); $M_A$ is the molecular weight of m-A; $M_B$ is the molecular weight of the m-B), wherein m-A and m-B represent the monomer, or monomer combinations, forming blocks A and B, respectively. In some embodiments, for example to produce tough plastics, the weight content of block B, with reference to block A, is 55 wt % or more, e.g. 55-90 or 55-80 wt %. In some embodiments, for example to produce shape memory materials, the weight content of block B, with reference to block A, is 30-55, 35-55 or 35-50 wt %. In some embodiments, for example to produce thermoplastic elastomers, the weight content of block B, with reference to block A, is no more than 30 wt %, e.g. 10-30 or 20-30 wt %.

In some embodiments, the multi-block copolymer of the invention may have a $M_n$ (number average molecular weight) of, at least 1 kg/mol, preferably at least 10 kg/mol. In some embodiments, the blocks A-B-A or B-A-B of a multi-block copolymer of the invention may have a $M_n$ of, at least 1 kg/mol, preferably at least 10 kg/mol.

In some embodiments, the multi-block copolymer of the invention may have a Young's modulus of 1 MPa to 7000 MPa. In some embodiments, the Young's modulus is from 10-200 MPa, preferably 40-100 MPa. For example, this may in some embodiments apply where the weight content of block B, with reference to block A, is 30-55, 35-55 or 35-50 wt %. In other embodiments, the Young's modulus is from 1-10 MPa. For example, this may apply in some embodiments where the weight content of block B, with reference to block A, is no more than 30 wt %, e.g. 10-30 or 20-30 wt %. In yet other embodiments, the Young's modulus is at least 50 MPa, for example 200 MPa to 7000 MPa, preferably 223 MPa to 6600 MPa. In some embodiments, the multi-block copolymer may have an elongation at break of 100% to 1200%, preferably at least 200%, for example 350% to 1000%. For example, this may in some embodiments apply where the weight content of block B, with reference to block A, is 55 wt % or more, e.g. 55-90 or 55-80 wt %.

In preferred embodiments, the epoxide may have the following formula:

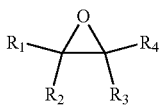

wherein each $R_1$, $R_2$, $R_3$ and $R_4$ is independently selected from hydrogen, halogen, nitro, alkoxy, aryloxy, heteroaryloxy, alkylamino, imine, nitrile, acetylide, carboxylate or optionally substituted aliphatic, heteroaliphatic, alicyclic, heteroalicyclic, aryl, branched alkyl heteroaryl, alkylaryl or alkylheteroaryl, or a polymeric species [e.g. polybis(phenol)A]; or two or more of $R_1$, $R_2$, $R_3$ and $R_4$ can be taken together to form a saturated, partially saturated or unsaturated 3 to 12 membered, optionally substituted ring system, optionally containing one or more heteroatoms.

Preferred examples of epoxides include propylene oxide, cyclohexene oxide, substituted cyclohexene oxides (such as limonene oxide, $C_{10}H_{16}O$, 2-(3,4-epoxycyclohexyl)ethyltrimethoxysilane, $C_{11}H_{22}O$ or 4-vinyl-1-cyclohexene 1,2-epoxide, $C_8H_{12}O$), alkylene oxides (such as ethylene oxide and substituted ethylene oxides), substituted oxiranes (such as epichlorohydrin, 1,2-epoxybutane, glycidyl ethers), styrene oxide or substituted styrene oxides. For example, epoxides, may have the following structures:

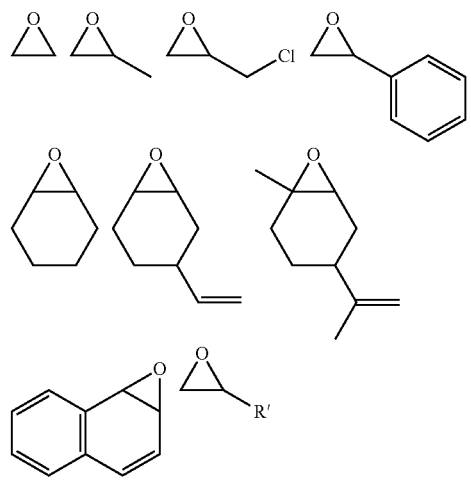

wherein R' is optionally substituted $C_{2-12}$ (preferably $C_{2-8}$, more preferably $C_{2-6}$) aliphatic. The aliphatic is preferably alkyl. The alkyl is preferably a straight chain alkyl, which is preferably unsubstituted.

In preferred embodiments, the anhydride may have the following formula:

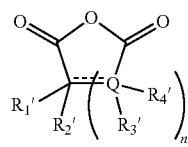

wherein n is 1, 2, 3, 4, 5, or 6 (preferably 1 or 2), each $R_{1'}$, $R_{2'}$, $R_{3'}$ and $R_{4'}$ is independently selected from hydrogen, halogen, nitro, alkoxy, aryloxy, heteroaryloxy, alkylamino, imine, nitrile, acetylide, carboxylate or optionally substituted aliphatic, heteroaliphatic, alicyclic, heteroalicyclic, aryl, branched alkyl heteroaryl, alkylaryl or alkylheteroaryl, or a polymeric species (e.g. polybis(phenol)A); or two or more of $R_{1'}$, $R_{2'}$, $R_{3'}$ and $R_{4'}$ can be taken together to form a saturated, partially saturated or unsaturated 3 to 12 membered, optionally substituted ring system, optionally containing one or more heteroatoms, or can be taken together to form a double bond. Each Q is independently C, O, N or S, preferably C, wherein $R_{3'}$ and $R_{4'}$ are either present, or absent, and ===== can either be ══ or ——, according to the valency of Q. It will be appreciated that when Q is C, and ===== is ——. In some embodiments, the anhydride comprises an aromatic moiety. Preferable anhydrides include those set out below.

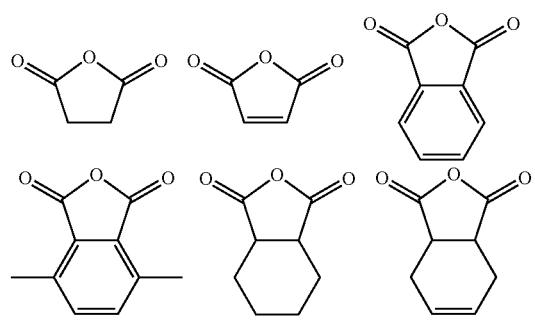

-continued

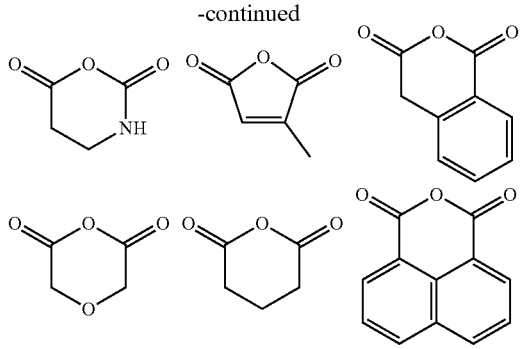

In preferred embodiments, the lactone may have the following formula:

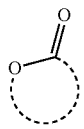

wherein

represents a hydrocarbon ring having 2 to 20 (e.g. 1, 2, 3, 4, 5, 6, 7, 8, 9, 10, 11, 12, 13, 14, 15, 16, 17, 18, 19 or 20, preferably at least 4, e.g. 4, 5 or 14) ring carbon atoms in addition to the carbon of the —C(O)O moiety, wherein the ring is saturated or contains one or more C═C double bonds and wherein each saturated ring carbon atom is substituted by $R_a$ and $R_b$ and each unsaturated carbon atom is substituted by $R_a$, wherein $R_a$ and $R_b$ are independently selected from hydrogen, halogen, nitro, alkoxy, aryloxy, heteroaryloxy, alkylamino, imine, nitrile, acetylide, carboxylate or optionally substituted aliphatic, heteroaliphatic, alicyclic, heteroalicyclic, aryl, branched alkyl heteroaryl, alkylaryl or alkylheteroaryl. Two or more of $R_a$ and $R_b$ on adjacent ring carbon atoms can be taken together to form a saturated, partially saturated or unsaturated 3 to 15 membered, optionally substituted ring system, optionally containing one or more heteroatoms. Preferably, each instance of $R_a$ and $R_b$ is, independently, selected from hydrogen or alkyl. Preferably, at least one of $R_a$ and $R_b$ is selected from substituent other than hydrogen. Preferably, the lactone comprises one or more of an optionally substituted alkyl substituent (e.g. $C_{1-10}$ alkyl, preferably $C_{3-8}$ alkyl) on the hydrocarbon ring, an aromatic component or at least one C═C double bond. Preferred lactones include those set out below:

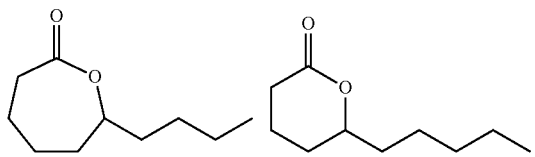

-continued

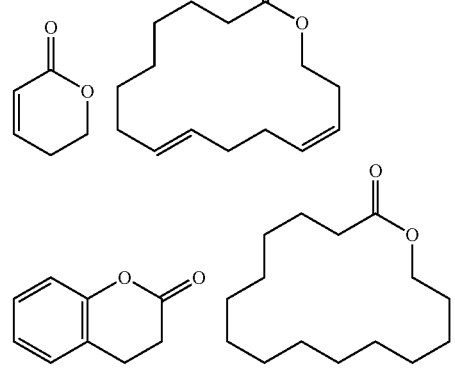

In preferred embodiments, the lactide may have the following formula:

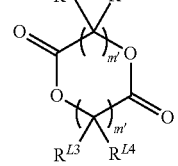

Wherein m' is 1, 2, 3, 4, 5, 6, 7, 8, 9 or 10, (preferably 1 or 2, more preferably, 1) and $R^{L3}$ and $R^{L4}$ are independently selected from hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl. Two or more of $R^{L3}$ and $R^{L4}$ can be taken together to form a saturated, partially saturated or unsaturated 3 to 12 membered, optionally substituted ring system, optionally containing one or more heteroatoms, When m' is 2 or more, the $R^{L3}$ and $R^{L4}$ on each carbon atom may be the same or different or one or more $R^{L3}$ and $R^{L4}$ on adjacent carbon atoms can be absent, thereby forming a double or triple bond. It will be appreciated that while the compound has two moieties represented by $(-CR^{L3}R^{L4})_{m'}$, both moieties will be identical. In particularly preferred embodiments, m' is 1, $R^{L4}$ is H, and $R^{L3}$ is H, hydroxyl or a $C_{1-6}$alkyl, preferably methyl. The stereochemistry of the moiety represented by $(-CR^{L3}R^{L4})_{m'}$, can either be the same (for example RR-lactide or SS-lactide), or different (for example, meso-lactide). The lactide may be a racemic mixture, or may be an optically pure isomer. Preferred lactides include those set out below:

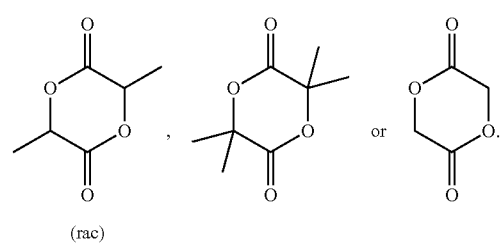

(rac)

Preferably, the lactide is rac-lactide:

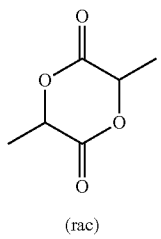

(rac)

Preferred optional substituents of the groups $R^{L1}$, $R^{L2}$, $R^{L3}$, and $R^{L4}$ include halogen, nitro, hydroxyl, unsubstituted aliphatic, unsubstituted heteroaliphatic unsubstituted aryl, unsubstituted heteroaryl, alkoxy, aryloxy, heteroaryloxy, amino, alkylamino, imine, nitrile, acetylide, and carboxylate.

In preferred embodiments, block A may comprise a polyester formed by polymerisation of ε-decalactone. Block B may, for example, comprise poly(cyclohexylene phthalic) ester, an alternating copolyester formed from polymerization of cyclohexene oxide and phthalic anhydride, a polycarbonate formed from polymerization of cyclohexene oxide or 4-vinyl-1-cyclohexene 1,2-epoxide and carbon dioxide (poly(cyclohexylene carbonate) (PCHC) or poly (vinylcyclohexenecarbonate) (PvCHC), or a combination thereof. Preferably Block B comprises poly(cyclohexylene phthalic)ester.

In any of the embodiments described above, block A may for example consist essentially of a polyester formed by polymerisation of a lactone and/or a lactide; block B may consist essentially of a copolyester formed by polymerisation of an epoxide and an anhydride, or a polycarbonate formed by polymerisation of an epoxide and carbon dioxide, and blocks A and B may be directly linked.

A multi-block copolymer as described herein may, for example, be a multi-block polymer having a degree of crystallinity ($\chi$) of no more than 20%, no more than 15%, no more than 10% or no more than 5% for the multi-block copolymer as a whole, as determined by WAXS or DSC.

In another aspect, the present invention provides a multi-block copolymer comprising at least blocks A-B-A or B-A-B, wherein block A comprises a polyester formed by polymerisation of a lactone and/or a lactide; and block B comprises a copolyester formed by polymerisation of an epoxide and an anhydride, or a polycarbonate formed by polymerisation of an epoxide and carbon dioxide, wherein the block B comprises an aromatic moiety and/or wherein the lactone is as defined herein and comprises one or more of (i) one or more of $R_a$ and $R_b$ selected from a substituent other than hydrogen; (ii) an optionally substituted alkyl substituent (e.g. $C_{1-10}$ alkyl, preferably $C_{3-8}$ alkyl) on the hydrocarbon ring, (iii) an aromatic component; and (iv) at least one C=C double bond; and/or with the proviso that the lactone is not ε-caprolactone. It will be appreciated that embodiments described herein for blocks A and B apply mutatis mutandis to this aspect.

In some embodiments, block A may comprise a polyester formed by polymerisation of ε-decalactone. Block B may, for example, comprise poly(cyclohexylene phthalic)ester, an alternating copolyester formed from polymerization of cyclohexene oxide and phthalic anhydride, a polycarbonate formed from polymerization of cyclohexene oxide or 4-vinyl-1-cyclohexene 1,2-epoxide and carbon dioxide (poly(cyclohexylene carbonate) (PCHC) or poly(vinylcyclohexenecarbonate) (PvCHC), or a combination thereof. Preferably Block B comprises poly(cyclohexylene phthalic) ester.

In some embodiments, block A consists essentially of a polyester formed by polymerisation of a lactone and/or a lactide; block B consists essentially of a copolyester formed by polymerisation of an epoxide and an anhydride, or a polycarbonate formed by polymerisation of an epoxide and carbon dioxide, and blocks A and B are directly linked.

In a second aspect, the invention provides a 'one-pot' method for producing a multi-block copolymer comprising at least blocks A-B-A, wherein block A comprises a polyester formed by polymerisation of a lactone and/or a lactide; and block B comprises a copolyester formed by polymerisation of an epoxide and an anhydride, or a polycarbonate formed by polymerisation of an epoxide and carbon dioxide, wherein the method comprises forming a reaction mixture comprising:
i. an epoxide;
II. an anhydride or carbon dioxide; and
iii. a lactone and/or a lactide; and
iv. a catalytic system comprising a catalyst of formula (I) and an initiator;
such that polymerisation occurs to form a multi-block copolymer comprising at least blocks A-B-A,
wherein the catalyst is of formula (I):

wherein:
[M] is a metal complex having at least one metal atom M coordinated by a ligand system; M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-,
each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;
X is C or S
R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate;
wherein the initiator is a multifunctional protic compound comprising at least two moieties independently selected from —OH, —SH, —C(O)OH or —NH—, or wherein the initiator is water.

It will be appreciated that the definition of the catalyst system for use in the method of the present invention is not limiting and encompasses any catalyst of formula (I), in particular any catalyst of formula (I) suitable for polymerisation of an epoxide with carbon dioxide, or an anhydride, to form a polycarbonate polyol or polyester polyol respectively.

Such known catalyst systems generally comprise a metal, and a ligand. The metal can be selected from Zn, Ni, Ru, Mo, Fe, Mn, Mo, Cr, V, Co, Ti, W, Al, Ca, Ge or Mg. In preferred embodiments, the metal is Zn, Mg, or Co, more preferably Mg or Zn. The catalyst can comprises one or more metal atoms, such as two metal atoms. The ligand can be a monodentate or poly dentate ligand, such as a bi-dentate, tri-dentate or tetradentate ligand.

In particular, the methods of the present invention can use a metal co-ordination compound comprising the following tetradentate ligands as disclosed in WO2010/028362, the contents of which are incorporated herein by reference:

salen derivatives; derivatives of salan ligands; bis-2-hydroxybenzamido derivatives; derivatives of the Trost ligand; porphyrin derivatives; derivatives of tetrabenzoporphyrin ligands; derivatives of corrole ligands; phthalocyaninate derivatives; and dibenzotetramethyltetraaza[14]annulene derivatives.

The invention relates to catalysts comprising metal complexes comprising two or metal atoms complexed to one or more multidentate ligand(s) as disclosed in WO2012/037282, the contents of which are incorporated herein by reference.

The invention further encompasses the use of catalysts comprising bulky β-diiminate (BDI) ligands for example (BDI)-ZnO$^i$Pr as disclosed in Coates et al, J.A.C.S., (2001), 123, 3229-3238, the contents of which are incorporated herein by reference. An additional example of such a catalyst includes the salen Co(III)X/onium salt catalyst system as disclosed in Lu et al, J.A.C.S., (2012), 134, 17739-17745, the contents of which are incorporated herein by reference.

The invention further encompasses catalysts comprising two metal atoms complexed to a multidentate ligand system as disclosed in WO2009/130470, WO2013/034750 and WO2014/184578, the entire contents of which are incorporated herein by reference.

Other examples of known catalyst systems for use in the method of the present invention include (BDI)Zn—OAc as disclosed in R. C. Jeske, A. M. DiCiccio, G. W. Coates, *J. Am. Chem. Soc.* 2007, 129, 11330-11331, (salen)Cr—Cl as disclosed in D. J. Darensbourg, R. R. Poland, C. Escobedo, *Macromolecules* 2012, 45, 2242-2248, (salen)M-Cl, where M is Cr, Al, Co or Mn, as disclosed in C. Robert, F. De Montigny, C. M. Thomas, *Nature Comm.* 2011, 2, 586, (salen)-Co—O$_2$CPH as disclosed in M. DiCicco, G. W. Coates, *J. Am. Soc.* 2011, 133, 10724-10727, (Tp-porph) Al—Cl as disclosed in T. Aida, S. Inoue, *J. Am. Chem. Soc.* 1985, 107, 1358-1364 and T. Aida, K. Sanuki, S. Inoue, *Macromolecules* 1985, 18, 1049; (sal*)MCl where M is Al, Cr or Co as disclosed in E. Hosseini Nejad, C. G. W. van Melis, T. J. Vermeer, C. E. Koning, R. Duchateau, *Macromolecules*, 2012, 45, 1770-1776, (Ph-salen)Cr—Cl as disclosed in E. Hosseini Nejad, A. Paoniasari, C. E. Koning, R. Duchateau, *Polym. Chem*, 2012, 3, 1308, the contents of all of which are incorporated herein by reference.

In preferred embodiments of the first aspect, the catalyst of formula (I) is preferably a complex of formula (IA):

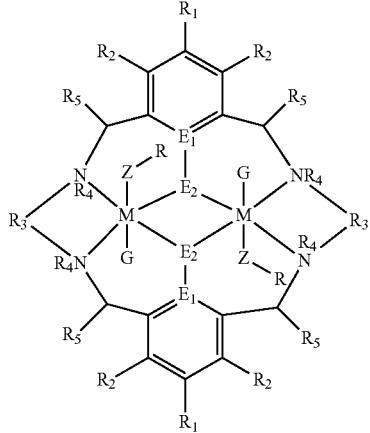

(IA)

wherein $R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;

$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;

$R_4$ is H, or optionally substituted aliphatic, heteroaliphatic, alicyclic, heteroalicyclic, aryl, heteroaryl, alkylheteroaryl or alkylaryl;

$R_5$ is H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

Z is absent, or is selected from -E-, -EX(E)-, or -EX(E)E-;

X is C or S;

E is —O—, —S—, or NR$^Z$, wherein is R$^Z$ is H, or optionally substituted aliphatic, heteroaliphatic, alicyclic, heteroalicyclic, aryl, heteroaryl, alkylaryl or alkylheteroaryl;

R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitro;

each G is independently absent or a neutral or anionic donor ligand which is a Lewis base, wherein when a G group is present, the G group may be associated with a single M as shown in formula (IA), or a single G group may be associated with both metal centres and form a bridge between the two metal centres; and M is Zn(II), Cr(II), Co(II), Mn(II), Mg(II), Fe(II), Ti(II), Cr(III)—Z—R, Co(III)—Z—R, Mn (III)—Z—R, Fe(III)—Z—R, Ca(II), Ge(II), Al(III)-Z—R, Ti(III)—Z—R, V(III)—Z—R, Ge(IV)-(—Z—R)$_2$ or Ti(IV)-(—Z—R)$_2$.

$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or optionally substituted alkyl, alkenyl, alkynyl, haloalkyl, aryl, heteroaryl, alicyclic or heteroalicyclic. $R_1$ and $R_2$ may be the same or different. $R_1$ and $R_2$ are preferably independently selected from hydrogen, tBu, Me, CF$_3$, phenyl, F, Cl, Br, I, NMe$_2$, NEt$_2$, NO$_2$, OMe, OSiEt$_3$, CNMe, CN or CCPh, more preferably hydrogen, OMe, Me, NO$_2$, halogen or tBu (e.g. hydrogen or tBu). In certain embodiments, $R_2$ is hydrogen and $R_1$ is any one of the groups defined above, preferably NO$_2$, halogen, tBu, OMe or Me, more preferably tBu, OMe or Me.

$R_3$ is a disubstituted alkyl, alkenyl, alkynyl, heteroalkyl, heteroalkenyl or heteroalkynyl group which may optionally be interrupted by an aryl, heteroaryl, alicyclic or heteroalicyclic group, or may be a disubstituted aryl or cycloalkyl group which acts as a bridging group between two nitrogen centres in the catalyst of formula (IA). Thus, where $R_3$ is a alkylene group, such as dimethylpropylene, the $R_3$ group has the structure —CH$_2$—C(CH$_3$)$_2$—CH$_2$—. The definitions of the alkyl, aryl, cycloalkyl etc groups set out above therefore also relate respectively to the alkylene, arylene, cycloalkylene etc groups set out for $R_3$. In certain embodiments, $R_3$ is optionally substituted alkylene, alkenylene, alkynylene, heteroalkylene, heteroalkenylene, heteroalkynylene, arylene, heteroarylene or cycloalkylene; wherein alkylene, alkenylene, alkynylene, heteroalkylene, heteroalkenylene and heteroalkynylene may optionally be interrupted by aryl, heteroaryl, alicyclic or heteroalicyclic. In particularly preferred embodiments, $R_3$ is a propylene group which is optionally substituted by aliphatic (preferably $C_{1-6}$alkyl) or aryl groups. Preferably $R_3$ is ethylene, 2,2-dimethylpropylene, propylene, butylene, phenylene, cyclohexylene or biphenylene, more preferably 2,2-dimethylpropylene. When $R_3$ is cyclohexylene, it can be the racemic, RR- or SS-forms.

$R_4$ is H, or optionally substituted aliphatic, heteroaliphatic, alicyclic, heteroalicyclic, aryl, heteroaryl, alkylheteroaryl or alkylaryl. Preferably $R_4$ is independently selected from hydrogen, or optionally substituted alkyl, alkenyl, alkynyl, aryl or heteroaryl. Exemplary options for $R_4$ include H, Me, Et, Bn, iPr, tBu or Ph. More preferably, $R_4$ is hydrogen.

$R_5$ is H, or optionally substituted aliphatic, heteroaliphatic, alicyclic, heteroalicyclic, aryl, heteroaryl, alkylheteroaryl or alkylaryl. Preferably $R_5$ is independently selected from hydrogen, or optionally substituted aliphatic or aryl. More preferably, $R_5$ is selected from hydrogen, alkyl or aryl. Exemplary $R_5$ groups include hydrogen, methyl, trifluoromethyl, ethyl and phenyl (preferably hydrogen, trifluoromethyl and methyl). In particularly preferred embodiments, all instances of $R_5$ are hydrogen.

In certain embodiments, $R_1$, $R_2$, $R_3$, $R_4$ and $R_5$ are each independently optionally substituted by halogen, hydroxyl, nitro, carbonate, alkoxy, aryloxy, heteroaryloxy, amino, alkylamino, imine, nitrile, acetylide, or unsubstituted aliphatic, heteroaliphatic, alicyclic, heteroalicyclic, aryl or heteroaryl. Preferably $R_1$, $R_2$, $R_3$, $R_4$ and $R_5$ are each independently optionally substituted by halogen, hydroxyl, nitro, carbonate, alkoxy, aryloxy, imine, nitrile, acetylide, unsubstituted aliphatic, unsubstituted alicyclic and unsubstituted aryl.

In certain embodiments, $E_1$ is C, $E_2$ is O, S or NH, and preferably $E_2$ is O. In other embodiments, $E_1$ is N and $E_2$ is O. In particularly preferred embodiments, $E_1$ is C and $E_2$ is O.

G is either present or absent. When G is not absent, it is a group which is capable of donating a lone pair of electrons (i.e. a Lewis base). In certain embodiments, G is a nitrogen containing Lewis base. Each G may independently be neutral or negatively charged. If G is negatively charged, then one or more positive counterions will be required to balance out the change of the complex. Suitable positive counterions include group 1 metal ions (Na$^+$, K$^+$, etc), group 2 metal ions (Mg$^{2+}$, Ca$^{2+}$, etc), imidazolium ions, positively charged optionally substituted heteroaryl, heteroalicyclic or heteroaliphatic groups, ammonium ions (i.e. N($R^{12}$)$_4^+$), iminium ions (i.e. ($R^{12}$)$_2$C=N($R^{12}$)$_2^+$, such as bis(triphenylphosphine)iminium ions) or phosphonium ions (P($R^{12}$)$_4^+$), wherein each $R^{12}$ is independently selected from hydrogen or optionally substituted aliphatic, heteroaliphatic, alicyclic, heteroalicyclic, aryl or heteroaryl. Exemplary counterions include [H-B]$^+$ wherein B is selected from triethylamine, 1,8-diazabicyclo[5.4.0]undec-7-ene and 7-methyl-1,5,7-triazabicyclo[4.4.0]dec-5-ene.

G is preferably independently selected from an optionally substituted heteroaliphatic group, an optionally substituted heteroalicyclic group, an optionally substituted heteroaryl group, a halide, hydroxide, hydride, a carboxylate, an ether, a thioether, carbene, a phosphine, a phosphine oxide, an amine, an acetamide, acetonitrile, an ester, a sulfoxide, a sulfonate and water. More preferably, G is independently selected from water, an alcohol, a substituted or unsubstituted heteroaryl (imidazole, methyl imidazole, pyridine, 4-dimethylaminopyridine, pyrrole, pyrazole, etc), an ether (dimethyl ether, diethylether, cyclic ethers, etc), a thioether, carbene, a phosphine, a phosphine oxide, a substituted or unsubstituted heteroalicyclic (morpholine, piperidine, tetrahydrofuran, tetrahydrothiophene, etc), an amine, an alkyl amine (trimethylamine, triethylamine, etc), acetonitrile, an ester (ethyl acetate, etc), an acetamide (dimethylacetamide, etc), a sulfoxide (dimethylsulfoxide, etc), a carboxylate, a hydroxide, hydride, a halide, a nitrate, a sulfonate, etc. In some embodiments, one or both instances of G is independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. In certain embodiments, G may be a halide; hydroxide; hydride; water; a heteroaryl, heteroalicyclic or carboxylate group which are optionally substituted by alkyl, alkenyl, alkynyl, alkoxy, halogen, hydroxyl, nitro or nitrile. In preferred embodiments, G is independently selected from halide; water; a heteroaryl optionally substituted by alkyl (e.g. methyl, ethyl etc), alkenyl, alkynyl, alkoxy (preferably methoxy), halogen, hydroxyl, nitro or nitrile. In some embodiments, one or both instances of G is negatively charged (for example, halide). In further embodiments, one or both instances of G is an optionally substituted heteroaryl. Exemplary G groups include chloride, bromide, pyridine, methylimidazole (for example N-methyl imidazole) and dimethylaminopyridine (for example, 4-methylaminopyridine).

Preferably G is absent.

It will be appreciated that when a G group is present, the G group may be associated with a single M metal centre as shown in formula (IA), or the G group may be associated with both metal centres and form a bridge between the two metal centres.

Preferably M is Zn(II), Cr(III), Cr(II), Co(III), Co(II), Mn(III), Mn(II), Mg(II), Fe(II), Fe(III), Ca(II), Ge(II), Ti(II), Al(III), Ti(III), V(III), Ge(IV) or Ti(IV), more preferably Zn(II), Cr(III), Co(II), Mn(II), Mg(II), Fe(II) or Fe(III), and most preferably Zn(II) or Mg(II). It will be appreciated that when M is Cr(III), Co(III), Mn(III) or Fe(III), the catalyst of formula (IA) will contain an additional —Z—R group co-ordinated to the metal centre, wherein —Z—R is as defined herein. It will also be appreciated that when M is Ge(IV) or Ti(IV), the catalyst of formula (IA) will contain two additional —Z—R groups co-ordinated to the metal centre, wherein —Z—R is as defined above. In certain embodiments, when M is Ge(IV) or Ti(IV), both G may be absent.

The skilled person will also appreciate that each M may be the same (for example, both M may be Mg, Zn, Fe or Co) or each M may be different and can be present in any combination (for example, Fe and Zn, Co and Zn, Mg and Fe, Co and Fe, Mg and Co, Cr and Mg, Cr and Zn, Mn and Mg, Mn and Zn, Mn and Fe, Cr and Fe, Cr and Co, Al and Mg, Al and Zn etc). When M is the same metal, it will be appreciated that each M may be in the same oxidation state (for example both M may be Co(II), Fe(II) or Fe(III)), or in a different oxidation state (for example, one M may be Co(II) and the other M may be Co(III), one M may be Fe(II) and the other M may be Fe(III), or one M may be Cr(II) and the other M may be Cr(III)).

—Z— is either absent or selected from -E-, -E-X(E)- or -E-X(E)-E-.

X is C or S, preferably C.

E is O, S, or NR$^Z$.

When Z is -E-X(E)-, -E-X(E)- is preferably —O—(CO)—, —NR$^Z$—C(O)—, —O—C(=NR$^Z$)—, —O—C(S)—, —O—S(O)—, —NR$^Z$—S(O)— or —O—S(=NR$^Z$)—.

When Z is -E-X(E)-E-, -E-X(E)-E-, is preferably —O—(CO)—O—, —NR$^Z$—C(O)—O—, —NR$^Z$—C(O)—NR$^Z$, —O—C(=NR$^Z$)—O—, —O—C(=NR$^Z$)—NR$^Z$—, —O—C(S)—O—, —O—C(O)—NR$^Z$, —O—S(O)—O—, —NR$^Z$—S(O)—O—, —O—S(O)—NR$^Z$.

Preferably, each occurrence of E is O.

In certain embodiments, each E is O and X is C.

Each NR$^Z$ is independently H, or optionally substituted aliphatic, heteroaliphatic, alicyclic, heteroalicyclic, aryl, heteroaryl, alkylaryl or alkylheteroaryl. Preferably NR$^Z$ is hydrogen or $C_{1-6}$alkyl.

R is hydrogen, or optionally substituted aliphatic, heteroaliphatic, alicyclic, heteroalicyclic, aryl, heteroaryl, alkylaryl, alkylheteroaryl or silyl. Preferably, R is an optionally substituted alkyl, alkenyl, alkynyl, aryl, alkylaryl, cycloalkyl, cycloalkenyl, cycloalkynyl, heteroaryl, cycloheteroalkyl, alkylheteroaryl or silyl. More preferably, R is $C_{1-12}$alkyl, cycloalkyl or aryl (for example, methyl, ethyl, n-propyl, isopropyl, n-butyl, tert-butyl, phenyl, cyclohexyl etc).

When —Z— is absent, in addition to the above groups, R may also be a halide, phosphinate, azide or nitrate.

Preferably, R may be substituted by halogen, hydroxyl, nitro, unsubstituted aryl, unsubstituted alkyl, unsubstituted alkenyl, unsubstituted alkoxy and unsubstituted aryloxy. For example, R may be an alkyl group substituted by halogen, for instance R may be $CF_3$.

It will also be appreciated that R can be a polymer chain. For example, R may be a polycarbonate or a polyester.

The catalyst of formula (IA) has two or more occurrences of —Z—R, depending on the oxidation state of the metal M. Each —Z—R may be the same, or different.

The skilled person will also understand that the moiety in the group —R which is attached to the group —Z— will not be a heteroatom (for example, O, S or N) or a group C=E', where E' is a heteroatom (for example O, S, or N).

In particularly preferred embodiments, $R_1$ and $R_2$ are independently hydrogen, or optionally substituted alkyl, alkenyl, halogen, hydroxyl, nitro, alkoxy, aryl, heteroaryl, alkylaryl and alkylheteroaryl; $R_3$ is optionally substituted alkylene or arylene; $R_4$ is hydrogen, or optionally substituted alkyl or heteroaryl; $R_5$ is hydrogen or optionally substituted alkyl; $E_1$ is C and $E_2$ is O; M is Mg, Zn, Fe or Co; Z is either absent or selected from —O—R, O—C(O)—R or —OC(O)—O—R; R is optionally substituted alkyl, alkenyl, cycloalkyl, aryl, heteroaryl, alkylaryl or alkylheteroaryl; or when Z is absent, R is phosphinate or halide; G is either absent, or is selected from optionally substituted heteroaryl or halide. It will be appreciated that when G is a halogen, a counterion must be present. Preferably, the counterion is [H-B]$^+$, wherein B is preferably selected from NEt$_3$, 1,8-diazabicyclo[5.4.0]undec-7-ene (DBU) and 7-methyl-1,5,7-triazabicyclo[4.4.0]dec-5-ene (MTBD).

Exemplary catalysts of formula (IA) include:

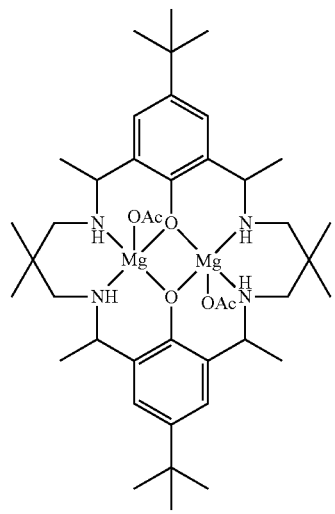

[L$^4$Mg$_2$(OAc)$_2$]

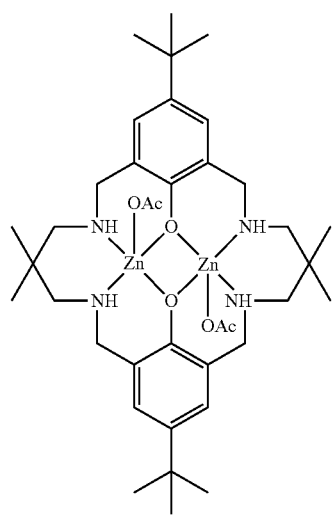

[L$^1$Zn$_2$(OAc)$_2$]

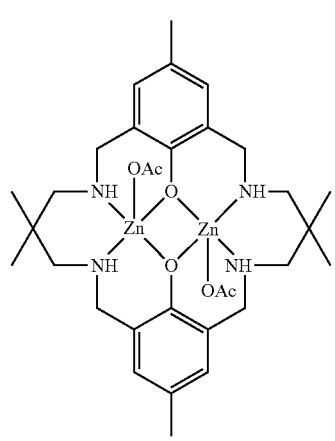

[L$^2$Zn$_2$(OAc)$_2$]

-continued

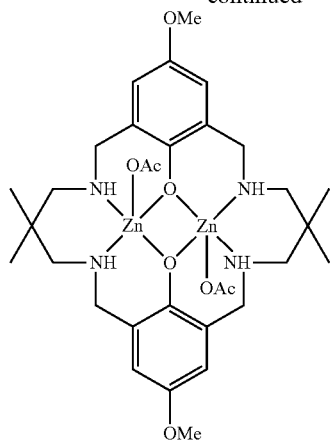

[L³Zn₂(OAc)₂]

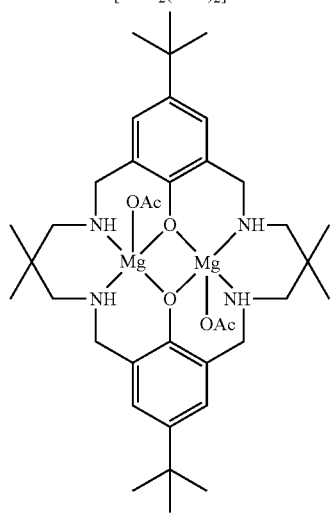

[L¹Mg₂(OAc)₂]

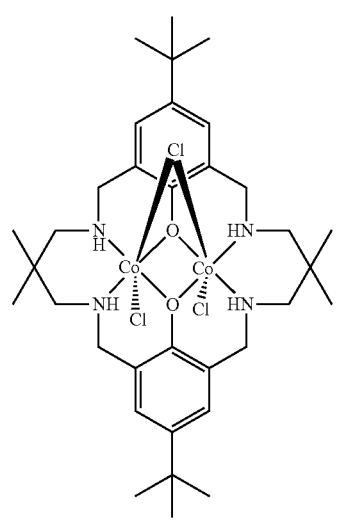

[L¹Co₂Cl₃]⁻[B-H]⁺
[B-H]⁺ represents any counterion, for example,
B may be NEt₃, 1,8-diazabicyclo[5.4.0]undec-7-ene (DBU),
7-methyl-1,5,7-triazabicyclo[4.4.0]dec-5-ene (MTBD), etc -continued

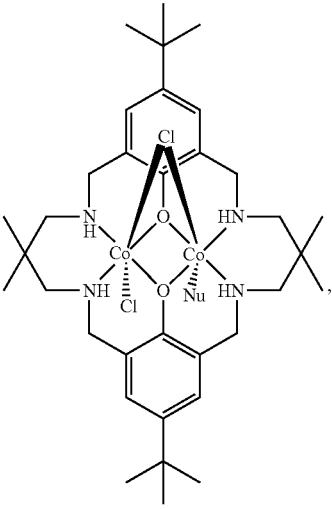

[L¹Co₂Cl₂Nu]
Nu = N-methylimidazole
   = pyridine
   = dimethylaminopyridine

[L¹Mg₂Cl₂(methylimidazole)], [L₁Mg₂Cl₂(dimethylaminopyridine)], [L₁Mg₂Br₂(dimethylaminopyridine)], [L¹Zn₂(F₃CCOO)₂], [L¹Zn₂(OOCC(CH₃)₃)₂], [L¹Zn₂(OC₆H₅)₂], [L¹Fe₂Cl₄], [L¹Co₂(OAc)₃], [L¹Zn₂(adamantyl carbonate)₂], [L¹Zn₂(pentafluorobenzoate)₂], [L¹Zn₂(diphenylphosphinate)₂], [L¹Zn₂(bis(4-methoxy)phenyl phosphinate)₂], [L¹Zn₂(hexanoate)₂], [L¹Zn₂(octanoate)₂], [L¹Zn₂(dodecanoate)₂], [L¹Mg₂(F₃CCOO)₂], [L¹Mg₂Br₂], [L¹Zn₂(C₆F₅)₂], [L¹Zn₂(C₆H₅)₂] and [L¹Zn₂(OiPr)₂], wherein L¹ is as illustrated above for L¹Zn₂OAc₂.

In some embodiments, when Z is absent or a group selected from -E-X(E)- or -E-X(E)E-, the catalyst system optionally comprises a compound [Y] which is capable of converting the group —Z—R, wherein Z is absent or a group selected from -E-X(E)- or -E-X(E)E-, to a group —Z—R wherein Z is -E-.

The compound [Y] may be capable of converting the group —Z—R, wherein Z is absent or a group selected from -E-C(E)- or -E-C(E)E-, to a group —Z—R wherein Z is -E-. In other words, the compound [Y] may be capable of inserting into the bond between the metal atom in the metal complex [M] and the group —Z—R in order to switch the ligand attached to the metal atom from —R, -E-C(E)-R or E-C(E)-E-R to -E-R.

The compound [Y] may be a compound having a three, four or five membered saturated ring and at least one heteroatom selected from O, S or N. In preferred embodiments, the compound [Y] may be an epoxide, an aziridine, an episulfide, an oxetane, a thietane, an azetidine, a saturated furan, a saturated thiophene or a pyrrolidine.

In certain embodiments, the compound [Y] has the following formula:

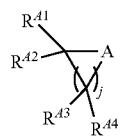

wherein

A is O, S or NR$^A$; (preferably A is O)

j is 1, 2, or 3;

R$^A$ is hydrogen, halogen, hydroxyl, alkoxy, aryloxy, heteroaryloxy, or aliphatic, heteroaliphatic, alicyclic, heteroalicyclic, aryl, heteroaryl, alkylaryl or alkylheteroaryl; Each R$^{A1}$, R$^{A2}$, R$^{A3}$ and R$^{A4}$ is independently selected hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl; or two or more of R$^{A1}$, R$^{A2}$, R$^{A3}$ and R$^{A4}$ can be taken together to form a saturated, partially saturated or unsaturated 3 to 12 membered, optionally substituted ring system, optionally containing one or more heteroatoms. For example, each R$^{A1}$, R$^{A2}$, R$^{A3}$ and R$^{A4}$ may be H; R$^{A1}$, R$^{A2}$ and R$^{A3}$ may be H and one or more R$^{A4}$ may be aryl or aliphatic, preferably phenyl or alkyl; R$^{A1}$ and R$^{A4}$ may be H, and R$^{A2}$ and R$^{A3}$ may be taken together to form a six to 10 membered carbon ring (saturated, unsaturated or partially saturated. For example, the compound [Y] may be:

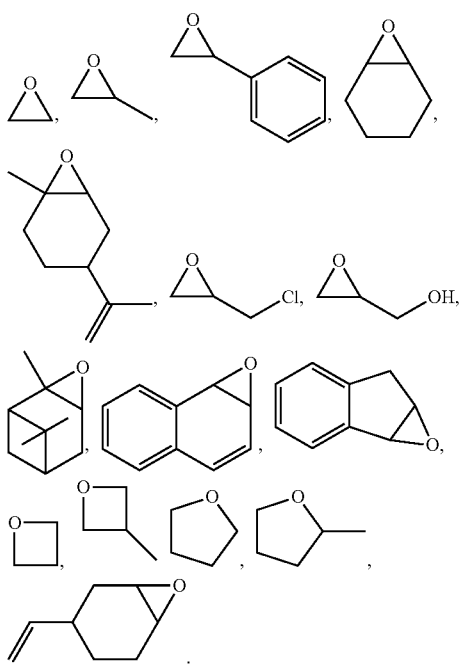

Preferred optional substituents of the groups R$^{A1}$, R$^{A2}$, R$^{A3}$ and R$^{A4}$ include halogen, nitro, hydroxyl, unsubstituted aliphatic, unsubstituted heteroaliphatic unsubstituted aryl, unsubstituted heteroaryl, alkoxy, aryloxy, heteroaryloxy, amino, alkylamino, imine, nitrile, acetylide, and carboxylate.

In preferred embodiments, the compound [Y] is an epoxide. When the compound [Y] is an epoxide, it will be appreciated that it may be the same, or different, to the epoxide monomer to be polymerised. Preferably, the compound [Y] is an epoxide which is the same as the epoxide to be polymerised by the method of the first aspect.

In some embodiments of the catalyst of formula (IA), Z is absent, or is -E-; E is —O—, —S—, or NR$^Z$, wherein R$^Z$ is H, or optionally substituted aliphatic, heteroaliphatic, alicyclic, heteroalicyclic, aryl, heteroaryl, alkylaryl or alkylheteroaryl; and R is an optionally substituted aliphatic, heteroaliphatic, alicyclic, heteroalicyclic, aryl, heteroaryl, alkylaryl or alkylheteroaryl. Preferably, Z is absent or is —O—, more preferably Z is absent.

Accordingly, preferred catalysts of formula (IA) include [L$^1$Mg$_2$Cl$_2$(methylimidazole)], [L$_1$Mg$_2$Cl$_2$(dimethylaminopyridine)], [L$_1$Mg$_2$Br$_2$(dimethylaminopyridine)] [L$^1$Zn$_2$(C$_6$F$_5$)$_2$], and [L$^1$Zn$_2$(C$_6$H$_5$)$_2$].

In a method of the second aspect of the invention, the initiator (CTA) may be present at a molar ratio of at least 1:1 relative to the catalyst of formula (I). For example, the molar loading of catalyst:initiator (CTA) is preferably 1:2 to 1:1000.

By "one-pot", it is meant that the multi-block copolymers comprising blocks A-B-A or B-A-B are formed in situ, in the presence of the catalytic system, without requiring any sequential addition of monomer. In other words, all of the monomers are added to the reaction mixture, with the catalytic system, at the start of the reaction. The reaction will then selectively form multi-block copolymers from the pool of monomers available. It will be appreciated that inclusion of a multi-functional initiator is important in enable formation of tri-block copolymers in a one-pot process. It will be appreciated that, subsequent to the formation of a multi-block copolymer comprising A-B-A or B-A-B, additional monomers and/or catalyst may be added to the reaction mixture, for example such that additional blocks are formed. For example, the method may comprise the step of adding additional monomer, selected from lactone, lactide; epoxide, anhydride, or carbon dioxide to the reaction mixture, subsequent to the formation of multi-block copolymer comprising A-B-A or B-A-B.

The method of the second aspect of the invention may be carried out at a temperature of about 50° C. to about 200° C., for example, from about 60° C. to about 140° C., such as from about 80° C. to about 120° C.

The method of the second aspect of the invention may be carried out under an inert atmosphere, for example under a nitrogen atmosphere.

It will be appreciated that the method of the second aspect of the invention may be used to prepare a multi-block copolymer as defined herein in relation to the first aspect of the invention. Accordingly, the method of the second aspect of the invention may form a multi-block copolymer comprising at least blocks A-B-A or B-A-B, wherein the multi-block copolymer is characterised by one or more of features (i) to (iii): (i) a degree of crystallinity ($\chi$) of block A of no more than 20% as determined by DSC; and/or (ii) a degree of crystallinity ($\chi$) of block A of no more than 20% as determined by WAXS; and/or (iii) a measureable T$_g$ for each of blocks A and B, with a difference of at least 10° C. between the T$_g$ for blocks A and B. It will be appreciated that all embodiments described herein in relation to blocks A and B of the first aspect of the invention apply mutatis mutandis to the second aspect of the invention.

It will be appreciated that as an alternative to the one-pot method of the second aspect of the invention, a multi-block copolymer of the invention may be prepared by a sequential addition process for example as described in WO2014/184578, the contents of which are incorporated herein by reference.

In a third aspect, the invention provides a method for producing a multi-block copolymer comprising blocks A-B-A or B-A-B, wherein block A comprises a polyester formed by polymerisation of a lactone and/or a lactide; and block B comprises a copolyester formed by polymerisation of an epoxide and an anhydride, or a polycarbonate formed by polymerisation of an epoxide and carbon dioxide, wherein the multi-block copolymer is characterised by one or more of features (i) to (iii): (i) a degree of crystallinity ($\chi$) of block A of no more than 20% as determined by DSC; and/or (ii) a degree of crystallinity ($\chi$) of block A of no more than 20% as determined by WAXS; and/or (iii) a measureable $T_g$ for each of blocks A and B, with a difference of at least 10° C. between the $T_g$ for blocks A and B, wherein the method comprises forming a reaction mixture comprising:
(a) forming a first block A or B by polymerizing first monomer or combination of monomers selected from
(i). an epoxide and an anhydride;
(ii). an epoxide and carbon dioxide; and
(iii). a lactone and/or a lactide;
by contacting the monomer or combination of monomers in a reaction mixture with a catalytic system comprising a catalyst of formula (I) and an initiator;
(b) forming a multi-block copolymer comprising blocks A-B-A or B-A-B by adding second monomer or combination of monomers to the reaction mixture, wherein if the first monomer is (i) or (ii), the second monomer is (iii) and if the first monomer is a (iii), the second monomer is (i) or (ii) such that polymerisation occurs to form a multi-block copolymer comprising blocks A-B-A or B-A-B, wherein the catalyst is of formula (I):

(I)

wherein:
[M] is a metal complex having at least one metal atom M coordinated by a ligand system;
M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-,
each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;
X is C or S
R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate; and
wherein the initiator is a multifunctional protic compound comprising at least two moieties independently selected from —OH, —SH, —C(O)OH or —NH—, or wherein the initiator is water.

It will be appreciated that all embodiments described herein in relation to blocks A and B of the first aspect of the invention and the method of the second aspect of the invention apply mutatis mutandis to the third aspect of the invention.

In a fourth aspect of the invention, there is provided a polymer obtainable from the method according to the third aspect of the invention.

In a fifth aspect of the invention, there is provided a polymer of the first, second or fourth aspects of the invention for use as a packaging material, a biomedical material, a sealant, an adhesive, an engineering material, a synthetic fibre, an automobile part or a foam or the like.

A wide range of mechanical properties can be achieved by simply changing the monomer composition used to form a multi-block copolymer of the invention, from tough plastics, shape memory materials to thermoplastic elastomers. For example, for tough plastics (e.g. wherein the weight content of block B, with reference to block A, is 55 wt % or more such as PDL-b-PCHPE-b-PDL with 59-100 wt % of PCHPE), the young's modulus can be tailored from 223 MPa to 6600 MPa. Therefore, it is possible to be applied to packaging materials (like LDPE), synthetic fiber (like Nylon) or engineering plastics (like Acrylonitrile Butadiene Styrene, ABS). Shape memory materials (e.g. wherein the weight content of block B, with reference to block A, is 35-50 wt %, such as PDL-b-PCHPE-b-PDL with ca 42 wt % of PCHPE) can be used in biomedical applications, such as self-tightening knots, orthopedic surgery, intravenous cannula, self-adjusting suture, vascular stent, etc. sealants, adhesives. Thermoplastic elastomers (e.g. wherein the weight content of block B, with reference to block A, is no more than 30 wt %, such as PDL-b-PCHPE-b-PDL with ca 26 wt % or less of PCHPE) can replace the SBS TPE can be used in automobile parts, shoe soles, adhesives, electrical cable jacket, etc.

EXAMPLES

Abbreviations
ATR-IR attenuated total reflectance—infra red
CHD 1,2-cyclohexane diol
CHO cyclohexene oxide
vCHO 4-Vinyl-1-cyclohexene 1,2-epoxide
DCM dichloromethane
DSC differential scanning calorimetry
ε-DL ε-decalactone
rac-LA rac-lactide
PA phthalic anhydride
PCHPE poly(cyclohexylene phthalic)ester
PDL polydecalactone
PCHC poly(cyclohexylene carbonate)
PvCHC poly(vinylcyclohexenecarbonate)
ROCOP ring opening copolymerization
ROP ring opening polymerization
SAXS small angle X-ray scattering
SEC size exclusion chromatography
SEC-MALLS SEC-multiple-angle-laser light scattering
THF tetrahydrofuran
TOF turnover frequency
WAXS wide-angle X-ray scattering SEC: The molecular weights and dispersities were characterized using an Agilent PL GPC-50 instrument, with GPC grade THF as the eluent at a flow rate of 1.0 mL·min$^{-1}$ at 40° C. Two Polymer labs Mixed D columns were used in series. Near monodispersed polystyrene standards were used to calibrate the instrument. The polyesters were dissolved in GPC grade THF and filtered prior to analysis. Another GPC, Shimadzu LC-20AD, was used to characterize the molecular weights and dispersities using MALLS detector, with two Mixed Bed PSS SDV linear S columns and THF as the eluent, at a flow rate of 1.0 mL·min$^{-1}$ at 30° C. The MALLS detector was calibrated by polystyrene standards and the do/dc values were measured using an external RID detector (Knauer) with at least 3 different concentrations of the polymer to be analysed. Crude polymers were used for SEC characterization unless stated otherwise.

NMR: $^1$H, $^{13}$C{$^1$H}, $^{31}$P{$^1$H} and 2D NMR (HSQC, DOSY) spectra were recorded using a Bruker AV 400 MHz spectrometer at room temperature (unless otherwise stated). All the $^{31}$P{$^1$H} NMR data used for end group calculation were recorded with extended relaxation delay ($d_1$) of 15 s (longest $t_1$ was determined to be 3 s).

MALDI-ToF MS: MALDI-ToF spectra of polyesters were carried out on Waters/Micromass MALDI micro MX spectrometer. The polymer samples were dissolved in THF at a concentration of 1 mg·mL$^{-1}$. Trans-2-[3-(4-tert-butylphenyl)-2-methyl-2-propenylidene]malononitrile (DCTB) was used as the matrix at a concentration of 10 mg·mL$^{-1}$ in THF. Potassium trifluoroacetate (KTFA) was used as the cationizing agent at a concentration of 1 mg·mL$^{-1}$. The solutions of polymer, matrix and salt were mixed in a ratio of 1/1/1 (v/v/v), respectively. The mixed solution was spotted on a stainless steel MALDI plate repeatedly (5 times) and left to dry in the fume hood, overnight. The spectrum was recorded using reflectron mode.

In situ ATR-IR Spectroscopy: The polymerizations were monitored using a Mettler-Toledo ReactIR 4000 spectrometer equipped with a MCT detector and a silver halide DiComp probe.

Thermal Analyses: Thermal properties were measured using DSC Q2000 (TA Instruments, UK). A sealed empty crucible was used as a reference, and the DSC was calibrated using indium. Samples of multi-block copolymers, such as PDL-PCHPE-PDL, were heated from room temperature to 125° C. at a rate of 10° C./min under helium flow and kept at 125° C. for 2 min to erase the thermal history. Then, the samples were cooled to −100° C. at a rate of 10° C./min and kept at −100° C./min for another 2 min followed by a heating procedure from −100° C. to 130° C. at a rate of 10° C./min. Each sample was run for three heating-cooling cycles. For new block copolymers, the temperature range for the experiments should be determined after evaluation by TGA. The upper limit on the temperature should be below the on-set of thermal degradation.

The glass transition temperatures ($T_g$) reported are taken from the third cycle. $T_g$ values are taken from the 'steps' observed from the DSC trace, which correspond to the changes in heat capacity. The exact $T_g$ value was taken to be the temperature in the middle of the incline of the 'steps' determined by the $T_g$ transition function in the software (universal analysis, version 4.3A).

Crystallinity ($\chi$) of block A may be calculated using the same DSC procedure. If the polymer sample contains any crystalline material a melting peak is observed. If no melting peak is observed crystallinity is assumed at zero percent. If a melting point is observed, crystallinity may be calculated via the following equation:

$$X = \frac{\Delta H_m}{\Delta H_m^o} \times 100\%$$

Where $\Delta H_m$ is the integral of the melting peak using the integral function provided in the software (universal analysis, version 4.3A), with the unit of J/g; $\Delta H_m^o$ is the amount of heat when 1 gram of 100% crystallized polylactone or polylactide is melted with the unit of J/g. The value of $\Delta H_m^o$ can be calculated by the extrapolation of the $\Delta H_m$ of polylactone or polylactide standards (with known crystallinity) to complete crystallinity. The $\Delta H_m$ values of different polylactone or polylactide standards are plotted against the crystallinity ($\chi$) of these standards. Then the plots are extrapolated to a crystallinity of 100%, where the corresponding $\Delta H_m$ value is defined as the $\Delta H_m^o$. In some instances, the value of $\Delta H_m^o$ can be found in literature (Crescenzi. V, G. Manzini, Calzolari. G and C. Borri, Eur. Polym. J., 1972, 8, 449).

Crystallinity ($\chi$) may also be determined using a wide-angle X-ray scattering (WAXS) procedure as follows. CuKα ($\lambda$=0.154 nm) X-ray is produced by a rotating anode X-ray generator (e.g. Rigaku ROTAFLEX RTP300) with a Cu target and a Ni filter. The goniometer was calibrated with NaCl to within 0.5°. The samples were continuously scanned from 4 to 50° (or corresponding vector q) at a rate of 1 deg·min$^{-1}$. The X-ray data were first modelled using a form which include Lorentzian line shapes for the crystalline peaks and a lorentzian plus a quadratic form for the amorphous scattering. Then, the data were fit using the CPLOT nonlinear least-squares fitting routine over the scattering range. The crystallinity ($\chi$) is calculated by this equation:

$$\chi = A_c/A_a \times 100\%$$

where $A_a$ is the integral of the amorphous contribution and $A_c$ is the integral of the crystalline peaks (described in W. Hu et al., Macromolecules 2002, 35, 5013-5024 or P. J. Rae et al, Polymer 2004, 45, 7615-7625, the contents of which are incorporated herein by reference).

The molecular weight ($M_n$, number average molecular weight) of polymers can be measured by Gel Permeation Chromatography (GPC) using, for example, a GPC-60 manufactured by Polymer Labs, using THF as the eluent at a flow rate of 1 ml/min on Mixed B columns, manufactured by Polymer Labs. Narrow molecular weight polystyrene standards can be used to calibrate the instrument.

All solvents and reagents were obtained from commercial sources (Aldrich and Fischer) and used as received unless stated otherwise. Cyclohexene oxide (CHO) was fractionally distilled over calcium hydride once prior to use and stored under an inert atmosphere. 4-vinyl-1-cyclohexene 1,2-epoxide (vCHO) was dried over calcium hydride prior to the distillation under reduced pressure and stored under $N_2$ protection at −35° C. ε-Decalactone (ε-DL) was dried over calcium hydride and stored under nitrogen. THF and toluene were distilled from sodium and stored under nitrogen. Phthalic anhydride (PA) was purified via dissolving in benzene and filtering the insoluble impurity (phthalic acid, proved by $^1$H NMR) followed by a recrystallization from CHCl$_3$ and sublimation once. Trans-1,2-cyclohexanediol (CHD) was recrystallized from ethyl acetate and kept under a nitrogen atmosphere. 2-Chloro-4,4,5,5-tetramethyl dioxaphospholane and 1,5,7-triazabicyclo[4.4.0]dec-5-ene (TBD) were used as received.

Preparation of Di-Zinc Complex 1

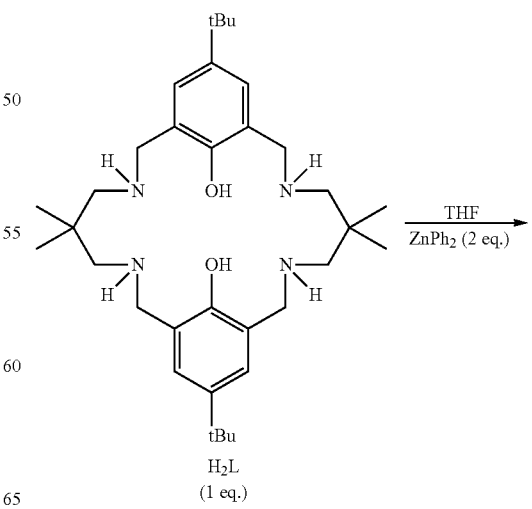

-continued

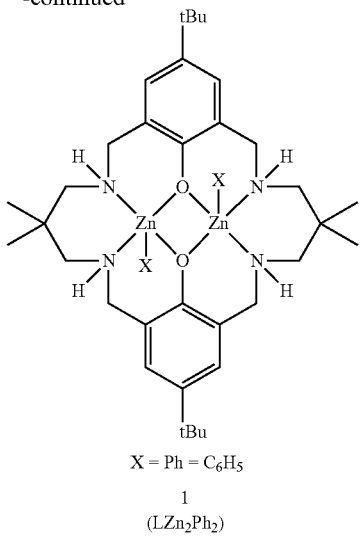

X = Ph = C$_6$H$_5$ 1
(LZn$_2$Ph$_2$)

The ligand H$_2$L may be prepared as described in WO2009/130470, the entire contents of which are incorporated herein by reference. To a precooled THF solution (−40° C., 5 mL) of H$_2$L (318.0 mg, 0.57 mmol.) was added a pre-cooled THF solution (−40° C., 2 mL) of diphenyl zinc (253 mg, 1.15 mmol.). After a few minutes the solution became cloudy. The mixture was allowed to react for 20 h at 25° C. and as, then, the produce was filtered. It was washed with cold THF (10 mL) and was isolated as a white powder (381 mg, 0.46 mmol., 81% yield).

$^1$H NMR (TCE-d$_2$, 403 K) d: 7.40 (br, aryl-H, 6H), 7.00 (br, aryl-H, 4H), 5.22-3.90 (br, 4H), 3.60-2.30 (br, 16H), 1.36 (br, $^t$Bu, 18H), 1.31 (br, CH$_3$, 6H), 1.06 (br, CH$_3$, 6H). $^{13}$C NMR (TCE-d$_2$, 403 K) d: 128.1, 126.8, 63.5, 56.8, 31.4, 27.9 and 21.5. (To avoid signals being broadened due to the different complex conformations at low temperature, NMR was conducted at 403 K) Elemental Analysis: Calcd. (%): C, 66.10; N, 7.72; H, 6.70; Found (%): C, 66.03, H, 7.72, N, 6.66.

Complex 1 shows good performance for epoxide/anhydride ROCOP, with results for PA/CHO ROCOP using complex 1 and CHD shown in Table 1 below.

| # | 1: diol$^a$ | $M_{n,theo}$$^b$ | $M_{nSEC\text{-}PS}$$^c$ (Đ) | $M_{nSEC\text{-}MALLS}$$^d$ (Đ) |
|---|---|---|---|---|
| 1 | 1:2 | 12.3 | 5.3 (1.33) | 9.3 (1.03) |
| 2 | 1:4 | 6.2 | 2.9 (1.29) | 5.2 (1.02) |
| 3 | 1:6 | 4.1 | 2.3 (1.33) | 3.6 (1.10) |
| 4 | 1:8 | 3.1 | 1.8 (1.27) | 2.9 (1.06) |
| 5 | 1:10 | 2.5 | 1.6 (1.32) | 2.5 (1.07) |

$^a$[1]:[PA]:[CHO] = 1:100:800, 100° C., 3-4 h, PA conversion >99%. Diol refers to 1,2-cyclohexane diol (CHD);
$^b$Determined on the basis of {([PA] + [CHO]) × (conversion of PA)}/[CHD], with units of kg · mol$^{-1}$;
$^c$Determined by SEC calibrated using narrow MW polystyrene (PS) standards, with units of kg · mol$^{-1}$;
$^d$Determined by SEC-MALLS in THF (dn/dc = 0.133 ± 0.001 mL · g$^{-1}$), with units of kg · mol$^{-1}$.

TOF values of 25 h$^{-1}$ and an excellent selectivity (>99%) for polyester (were observed). There was a high degrees of polymerization control, with polyesters having molecular weights (MW) which can be predicted from the quantity of added diol and narrow dispersities (≤1.30), features which are indicative of fast and reversible chain transfer reactions. The polymerization control is further demonstrated by MALDI-ToF analysis which shows a single series of perfectly alternating polyester chains, end-capped by α, w-dihydroxyl groups.

Complex 1, with CHD, was also tested, as a catalyst for the ROP of ε-DL, using CHO as the solvent. Results are shown in Table 2 below.

| # | 1: diol$^a$ | $M_{n,theo}$$^b$ | $M_{nSEC\text{-}PS}$$^c$ (Đ) | $M_{nSEC\text{-}MALLS}$$^d$ (Đ) |
|---|---|---|---|---|
| 1 | 1:2 | 17.0 | 14.0 (1.16) | 13.4 (1.07) |
| 2 | 1:4 | 8.5 | 7.8 (1.10) | 6.8 (1.06) |
| 3 | 1:6 | 5.7 | 6.7 (1.12) | 4.7 (1.05) |
| 4 | 1:8 | 4.3 | 5.3 (1.11) | 3.5 (1.11) |
| 5 | 1:10 | 3.4 | 4.3 (1.12) | 3.0 (1.05) |

$^a$[1]:[ε-DL]:[CHO] = 1:200:800, 100° C., 1.25 h, ε-DL conversion >95%. Diol refers to 1,2-cyclohexane diol (CHD);
$^b$Determined on the basis of {[ε-DL] × (conversion of ε-DL)}/[CHD], with units of kg · mol$^{-1}$;
$^c$Determined by SEC calibrated using narrow MW polystyrene (PS) standards, with units of kg · mol$^{-1}$;
$^d$Determined by SEC-MALLS, in THF, (dn/dc = 0.054 ± 0.001 mL · g$^{-1}$ for entry 1, 0.067 ± 0.001 mL · g$^{-1}$ for entry 2 and 0.072 ± 0.002 mL · g$^{-1}$ for entry 3-5), with units of kg · mol$^{-1}$.

Good activity was observed, with TOF values of 160 h$^{-1}$ and no evidence for any epoxide homopolymerization or insertion into the PDL chain.

FIG. 1 illustrates the ROCOP and ROP reactions catalyzed by complex 1.

Example 1: Sequence Controlled Chemoselective Terpolymerization of PA/CHO/ε-DL Using Complex 1

Figure 2:
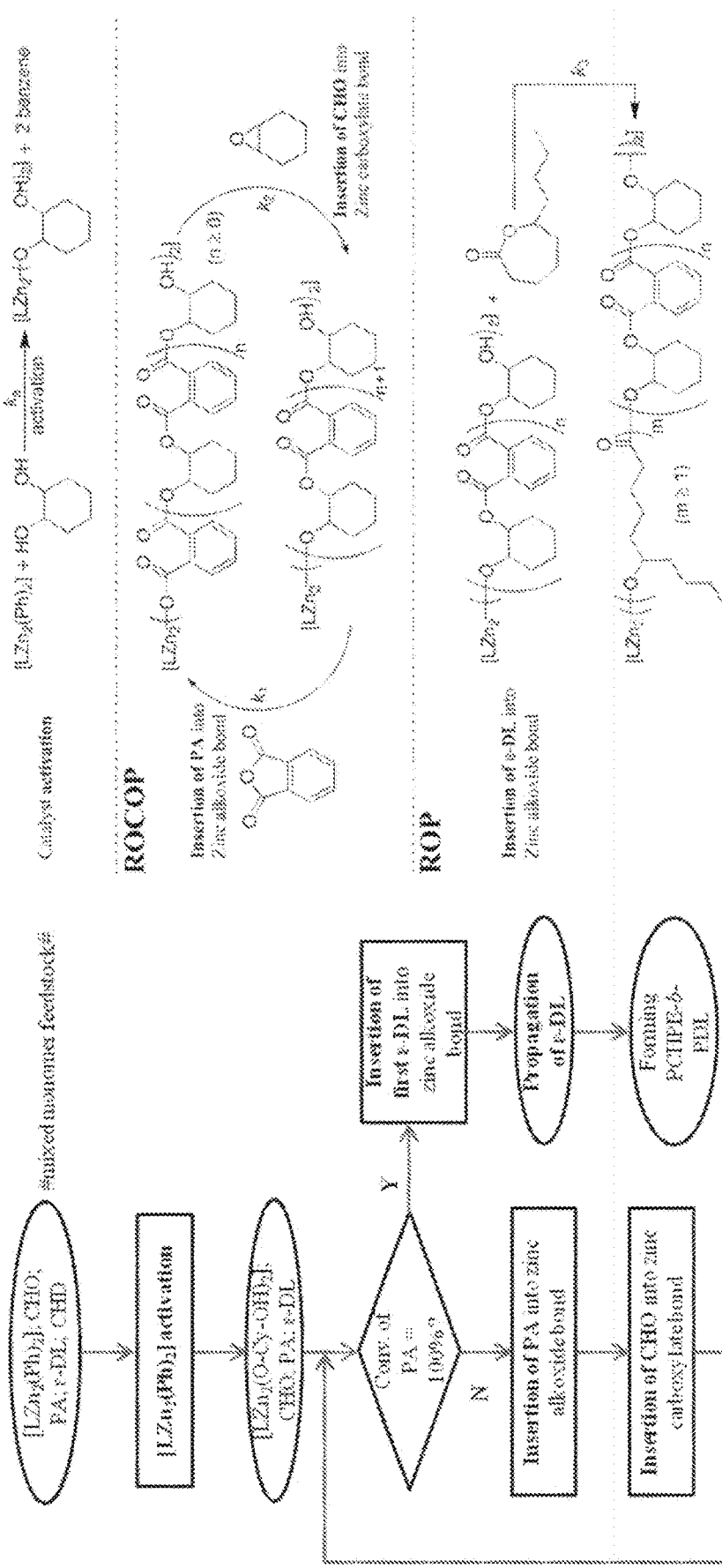
FIG. 2 shows (A) Diagram illustrating the chemoselective sequence controlled polymerization; (B) Reactions corresponding to the steps illustrated in (A).

Mixtures of lactone (ε-DL), epoxide (CHO) and anhydride (PA) monomers were reacted with the catalyst system comprising complex 1 and CHD. The terpolymerizations were all successful and an unexpected monomer selectivity was observed, resulting in the controlled formation of only ABA type block copolyesters. The chemoselective sequence controlled polymerisation is illustrated in FIG. 2. Typical preparations of PDL-b-PCHPE-b-PDL triblock copolyesters are recited below.

To afford PDL-b-PCHPE-b-PDL triblock copolyesters with 33 wt % of PCHPE the complex 1 (10.0 mg, 1.25×10$^{-2}$ mmol), phthalic anhydride (93.0 mg, 0.63 mmol), ε-DL (325.0 μL, 1.88 mmol) and a stock solution of CHD (116.0 μL; 24.0 mg·mL$^{-1}$ in CHO) were dissolved in CHO (884.0 μL, 8.91 mmol), under N$_2$ protection, in a screw-cap vial charged with a stir bar. The mixture was then heated to 100° C. and left to react, under an inert atmosphere, for 4.0 h. The relative molar ratio of [1]/[CHD]/[CHO]/[PA]/[ε-DL] was 1/2/800/50/100.

To afford PDL-b-PCHPE-b-PDL triblock copolyesters with 42 wt % of PCHPE, the complex 1 (10.0 mg, 1.25×10$^{-2}$ mmol), phthalic anhydride (186.0 mg, 1.26 mmol), ε-DL (650.0 μL, 3.76 mmol) and a stock solution of CHD (116.0 μL; 24.0 mg·mL$^{-1}$ in CHO) were dissolved in CHO (884.0 μL, 8.91 mmol), under N$_2$ protection, in a screw-cap vial charged with a stir bar. The mixture was then heated to 100° C. and left to react, under an inert atmosphere, for 4.0 h. The relative molar ratio of [1]/[CHD]/[CHO]/[PA]/[ε-DL] was 1/2/800/100/200.

To afford PDL-b-PCHPE-b-PDL triblock copolyesters with 59 wt % of PCHPE, the complex 1 (10.0 mg, 1.25×10$^{-2}$ mmol), phthalic anhydride (186.0 mg, 1.26 mmol), ε-DL (325.0 μL, 1.88 mmol) and a stock solution of CHD (116.0 μL; 24.0 mg·mL$^{-1}$ in CHO) were dissolved in CHO (884.0 μL, 8.91 mmol), under N$_2$ protection, in a screw-cap vial charged with a stir bar. The mixture was then heated to 100° C. and left to react, under an inert atmosphere, for 4.0 h. The relative molar ratio of [1]/[CHD]/[CHO]/[PA]/[ε-DL] was 1/2/800/100/100.

To afford PDL-b-PCHPE-b-PDL triblock copolyesters with 81 wt % of PCHPE, the complex 1 (10.0 mg, $1.25 \times 10^{-2}$ mmol), phthalic anhydride (279.0 mg, 1.89 mmol), ε-DL (162.5 μL, 0.94 mmol) and a stock solution of CHD (116.0 μL; 24.0 mg·mL$^{-1}$ in CHO) were dissolved in CHO (884.0 μL, 8.91 mmol), under $N_2$ protection, in a screw-cap vial charged with a stir bar. The mixture was then heated to 100° C. and left to react, under an inert atmosphere, for 4.0 h. The relative molar ratio of [1]/[CHD]/[CHO]/[PA]/[ε-DL] was 1/2/800/150/50.

In each case, the polymerization was terminated by cooling down to ambient temperature. Crude polymer was isolated by removal of the excess volatiles (CHO). Purified polyesters can be obtained by precipitation using cold MeOH.

Results obtained from polymerizations utilizing various monomer mixtures are show in Table 3 below.

| # | [PA]:[ε-DL][a] | % PCHPE[b] | $M_{ntheo}$[c] | $M_{nexp}$[d] | Đ[d] | $T_g$/° C.[e] |
|---|---|---|---|---|---|---|
| 1 | 0:100 | 0 | 8.5 | 6.9 | 1.20 | −58 |
| 2 | 50:100 | 33 | 18.9 | 12.3 | 1.25 | −49 |
| 3 | 100:200 | 42 | 28.0 | 15.9 | 1.21 | −49; 57 |
| 4 | 100:100 | 59 | 22.4 | 12.0 | 1.15 | −47; 61 |
| 5 | 150:50 | 81 | 22.7 | 11.9 | 1.29 | 55 |
| 6 | 100:0 | 100 | 12.3 | 5.3 | 1.33 | 97 |

[a][1]:[CHD]:[CHO] = 1:2:800, 100° C., PA and ε-DL conversion >95%; [b]Weight content of PCHPE block in the polyester (PDL-b-PCHPE-b-PDL); [c]Determined by {([PA] + [CHD]) × (conversion of PA) + [ε-DL] × (conversion of ε-DL)}/[CHD] with units of kg · mol$^{-1}$;
[d]Determined by SEC using polystyrene calibration, with units of kg · mol$^{-1}$. MALLS is not suitable for such block copolymer analysis. [Described by Gores et al. in Chromatography of Polymers (book) or Keller et al., Journal of Liquid Chromatography & Related Technologies, 2010, 33, 1587-1600.]
[e]Determined after three heating-cooling cycles, on the third cycle.

Figure 3:
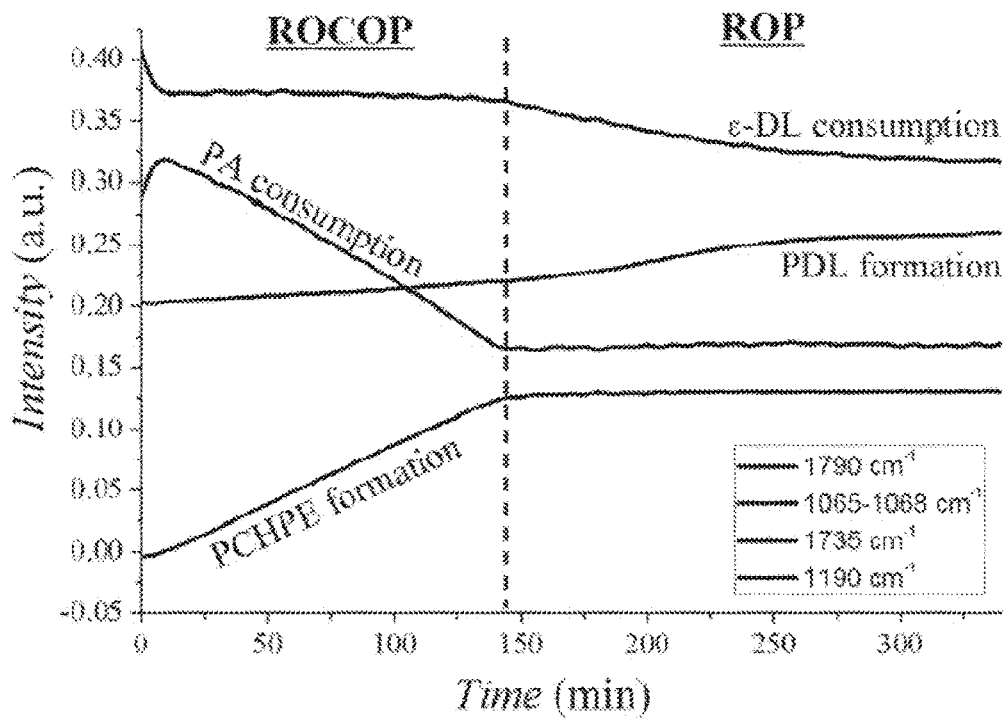
FIG. 3 shows a representative ATR-IR spectrum acquired during (PDL-b-PCHPE-b-PDL) formation (Table 3, entry 2). PA resonance is at 1790 $cm^{-1}$, PCHPE resonance is at 1065-1068 $cm^{-1}$, ε-DL resonance is at 1735 $cm^{-1}$ and PDL resonance is at 1190 $cm^{-1}$.

The terpolymerizations were monitored by ATR-IR spectroscopy which showed that initially epoxide/anhydride ROCOP occurred, as shown by the disappearance of the diagnostic PA resonance at 1790 cm$^{-1}$ and the growth of the characteristic polyester (PCHPE) resonance (1065-1068 cm$^{-1}$). FIG. 3 shows the ATR-IR spectrum acquired for Table 3, entry 2.

During this time, there was no change to any resonances associated with the lactone (ε-DL), a finding confirmed by aliquot analysis using $^1$H NMR spectroscopy which only showed signals for perfectly alternating polyester (PCHPE) and residual ε-DL. Once the PA was consumed, as confirmed independently by $^1$H NMR spectroscopy, and in the presence of excess CHO, the reaction entered the second phase whereby ε-DL ROP occurred leading to triblock polyester formation. During this stage, the ATR-IR monitoring showed the decrease of the ε-DL resonance, at 1735 cm$^{-1}$, accompanied by the growth of the block of poly(decalactone) as signalled by its resonance at 1190 cm$^{-1}$. The IR absorptions were all independently confirmed in control experiments using pure, isolated monomers/polymers.

Figure 4:
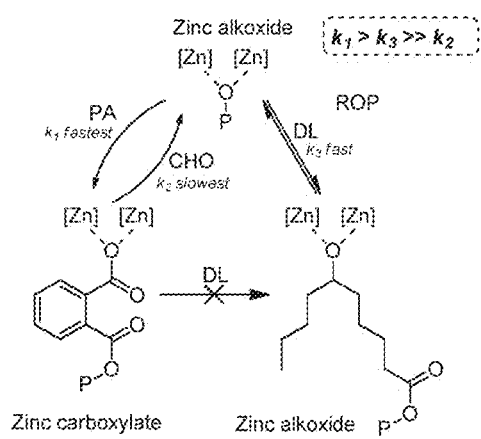
FIG. 4 shows a scheme illustrating the reactions proposed to occur during sequence-selective polymerizations. Where '[Zn] [Zn]' is the active site of complex 1 and 'P' is a propagating polymer chain.

The monomer sequence selectivity would not be expected on the basis of the TOF values for the two processes occurring independently. FIG. 4 illustrates the key intermediates present during polymerization. P represents the growing polymer chain. The different rate of insertion of monomers into the zinc alkoxide intermediate, which is common to both catalytic cycles, is considered to be responsible for the selectivity. Accordingly, the rate of PA insertion into the Zn-alkoxide bond is significantly faster than the insertion of ε-DL (i.e. $k_1 \gg k_3$). It is also relevant that the zinc-carboxylate intermediate, formed by PA insertion, does not react with lactones. Thus, the zinc-carboxylate intermediate can only react slowly with CHO to (re)form the zinc-alkoxide intermediate. Only, after the complete conversion of PA and in the presence of some epoxide, does the zinc-alkoxide intermediate catalyze the ε-DL ROP.

In general terms, the nature of the polymer blocks formed in a method of the invention may be controlled depending on the moiety at the end of the growing polymer chain attached to the metal complex [M], as well as the relative rates (k) at which monomers insert into the bond between the metal complex and the ligand —Z—R. Relative rates of insertion of monomers can be determined by exposing one or more of the monomers to a catalyst of formula (I), and monitoring the rate at which the monomer(s) is consumed, or the rate at which polymer is produced. This can be done, for example, using quantitative spectroscopic or analytic techniques which are well known in the art, such as attenuated total reflectance IR spectroscopy (ATRIR), NMR, optical absorption spectroscopy, IR, or titration.

For example, in the scheme below, $k_1$ represents the rate of insertion of anhydride or $CO_2$, $k_2$ represents the rate of insertion of epoxide and $k_3$ represent to rate of insertion of lactone/lactide. P represents the growing polymer chain, and its' structure will depend on the identity of the monomers being polymerised. It will be understood that the relative rates of insertion will affect the order in which the blocks are produced.

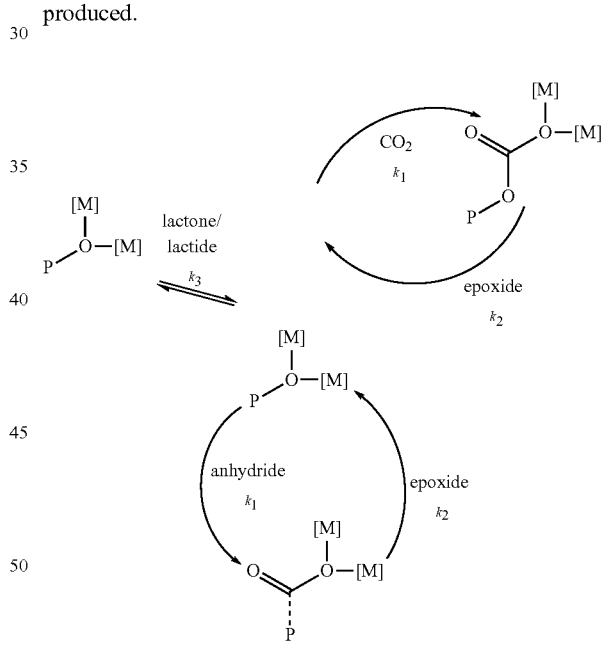

In certain instances, $k_1$ may be faster than $k_2$ and $k_3$ may be faster than $k_2$.

Figure 5:
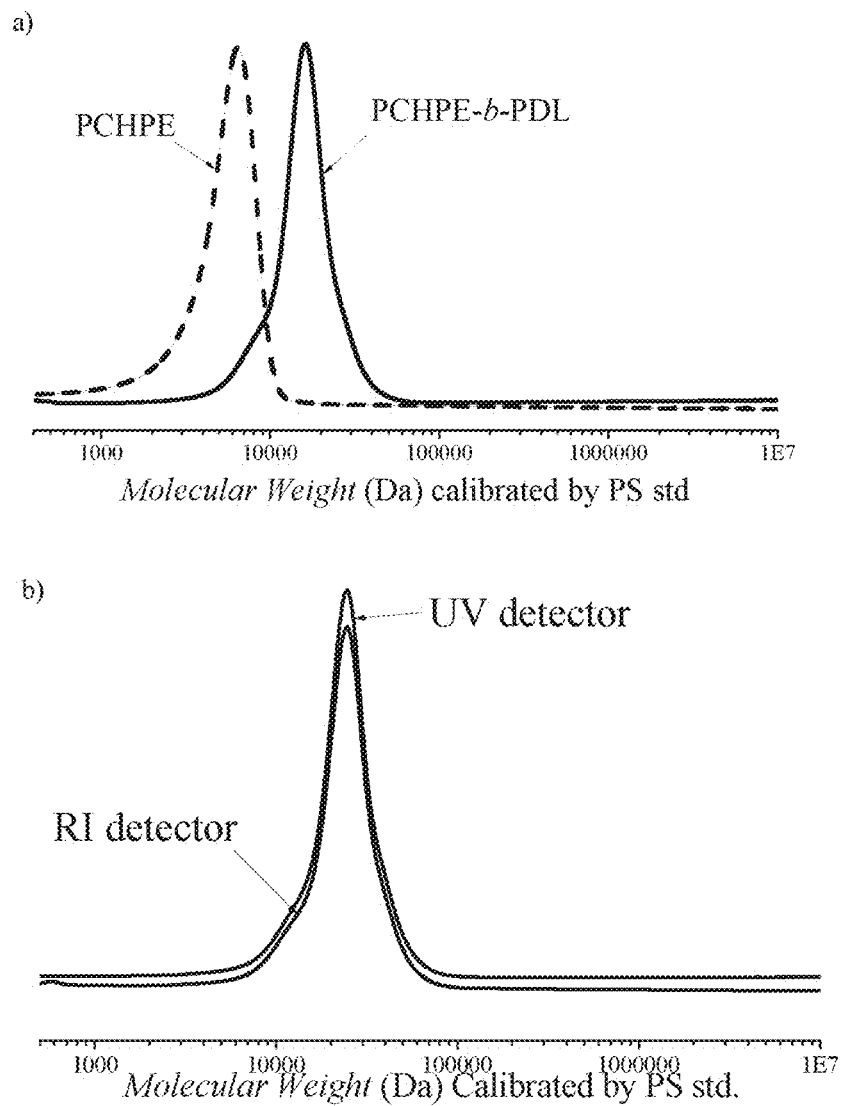
FIG. 5 shows a SEC traces of polymer aliquots before and after propagation of the PDL block (Table 3, #3) and b) Overlay of the SEC RI and UV outputs (inter-detector delay was corrected using toluene as internal standard).
Figure 6:
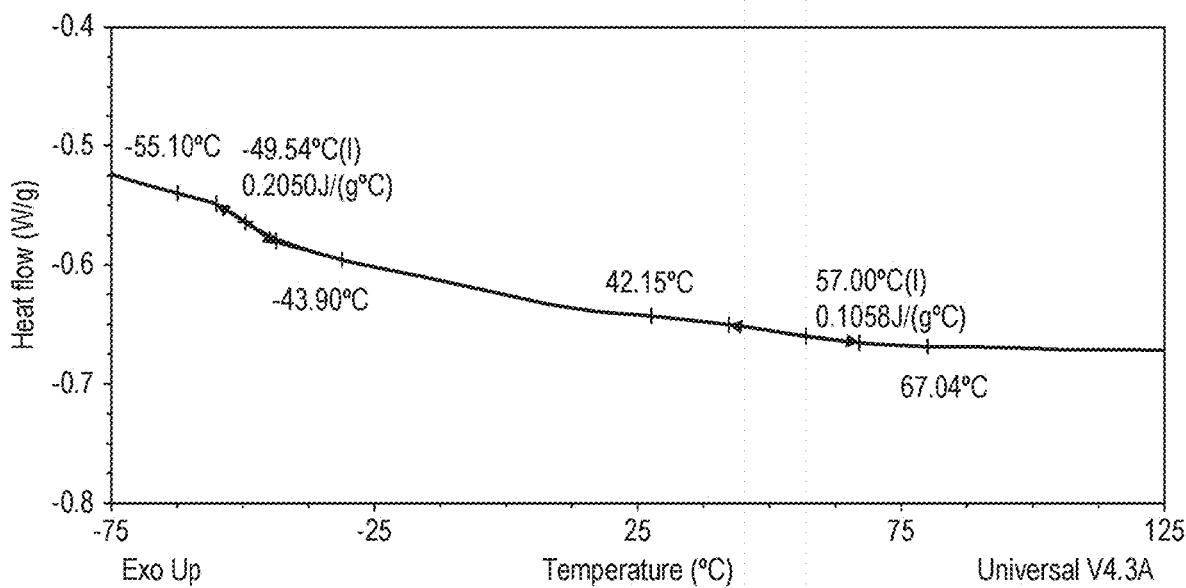
FIG. 6 shows DSC thermograms of (A) PDL-b-PCHPE-b-PDL (Table 3, #3) and (B) PCHPE/PDL blend (Table 3, #1 and #6).
Figure 6:
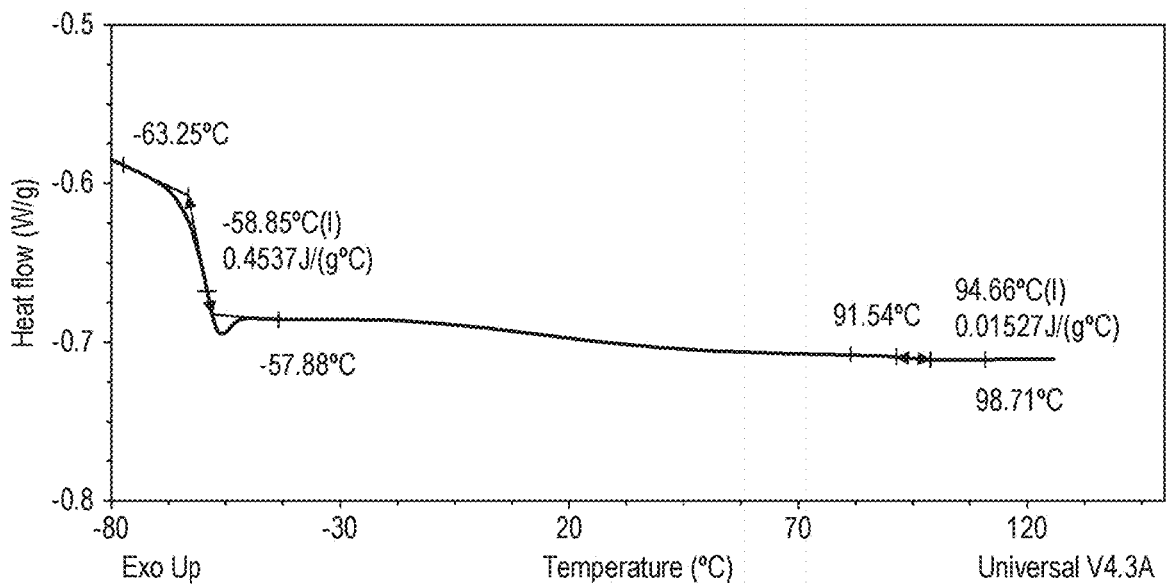

To confirm the ABA polymer structure, aliquots were analyzed by SEC just before the complete conversion of PA (ca. 95%) and after the propagation of PDL block (ca. 96% conv. of ε-DL) (FIG. 5a). It is quite clear that after ε-DL ROP the polymer has a higher MW and that in both cases distributions are monomodal, with narrow dispersities. Since the block formed by ROCOP (PCHPE) has an aromatic repeat unit, analysis using SEC with a UV-detector also served to confirm that the PCHPE and PDL blocks were attached to one another. Meanwhile, $^{31}$P{$^1$H} NMR spectroscopy was used to distinguish the two different hydroxyl groups of the polymer blocks (from PCHPE and PDL, respectively) on the basis of their chemical shifts after reaction with excess 2-chloro-4,4,5,5-tetramethyl dioxaphospholane (using biphenol A as an internal standard). The spectra showed that there was a shift from a peak at 147.1 ppm, assigned to PCHPE end groups, after the first phase of polymerization, to 149.2 ppm, assigned exclusively to PDL end groups for the ABA triblock. Furthermore, $^1$H DOSY NMR spectrum showed that all NMR signals belong to a single copolymer with the same diffusion coefficient; in contrast to a blend of PCHPE/PDL, of near equivalent MW, which showed two different diffusion coefficients.

The copolymers showed $T_g$ values tuneable over the range −59 to 61° C. The homopolymers are both amorphous, with $T_g$ values of −58° C. (PDL) and 97° C. (PCHPE), respectively. A blend of them showed identical $T_g$ values to the homopolymers. In contrast, the copolyesters with low (33 wt %) or high (81 wt %) PCHPE compositions showed only a single $T_g$, close to that of the dominant block material (PDL or PCHPE). Where the block composition was more evenly balanced (42-59 wt % PCHPE), two $T_g$ values were observed, suggesting phase separation occurred.

Example 2: Sequence Controlled Chemoselective Terpolymerization of PA/vCHO/ε-DL Using Complex 1 to Afford PDL-b-PvCHPE-b-PDL Triblock Copolyesters The complex 1 (10.0 mg, 1.25×10$^{-2}$ mmol), phthalic anhydride (186.0 mg, 1.26 mmol), ε-DL (325.0 μL, 1.88 mmol) and a stock solution of CHD (116.0 μL; 24.0 mg·mL$^{-1}$ in vCHO) were dissolved in vCHO (884.0 μL, 8.91 mmol), under N$_2$ protection, in a screw-cap vial charged with a stir bar. The mixture was then heated to 100° C. and left to react, under an inert atmosphere, for 4.0 h. The relative molar ratio of [1]/[CHD]/[vCHO]/[PA]/[ε-DL] was 1/2/800/100/100. The polymerization was terminated by cooling down to ambient temperature. The crude polymer was isolated by removal of the excess volatiles (CHO). Purified polyesters can also be obtained by precipitation using cold MeOH. Results obtained from this polymerization are shown in Table 4, entry 1 below.

The terpolymerizations were monitored by ATR-IR spectroscopy which showed that initially epoxide/anhydride ROCOP occurred, as shown by the disappearance of the diagnostic PA resonance at 1790 cm$^{-1}$ and the growth of the characteristic polyester (PCHPE) resonance (1065-1068 cm$^{-1}$).

During this time, there was no change to any resonances associated with the lactone (ε-DL), a finding confirmed by aliquot analysis using $^1$H NMR spectroscopy which only showed signals for perfectly alternating polyester (PCHPE) and residual ε-DL. Once the PA was consumed, as confirmed independently by $^1$H NMR spectroscopy, and in the presence of excess CHO, the reaction entered the second phase whereby ε-DL ROP occurred leading to triblock polyester formation. During this stage, the ATR-IR monitoring showed the decrease of the ε-DL resonance, at 1735 cm$^{-1}$, accompanied by the growth of the block of poly(decalactone) as signalled by its resonance at 1190 cm$^{-1}$. The IR absorptions were all independently confirmed in control experiments using pure, isolated monomers/polymers.

Example 3: Sequence Controlled Chemoselective Terpolymerization of PA/CHO/Rac-LA Using Complex 1 to Afford PLA-b-PCHPE-b-PLA Triblock Copolyesters The complex 1 (10.0 mg, 1.25×10$^{-2}$ mmol), phthalic anhydride (186.0 mg, 1.26 mmol), rac-LA (271.0 mg, 1.88 mmol) and a stock solution of CHD (116.0 μL; 24.0 mg·mL$^{-1}$ in CHO) were dissolved in CHO (884.0 μL, 8.91 mmol), under N$_2$ protection, in a screw-cap vial charged with a stir bar. The mixture was then heated to 100° C. and left to react, under an inert atmosphere, for 4.0 h. The relative molar ratio of [1]/[CHD]/[CHO]/[PA]/[rac-LA] was 1/2/800/100/100. The polymerization was terminated by cooling down to ambient temperature. The crude polymer was isolated by removal of the excess volatiles (CHO). Purified polyesters can also be obtained by precipitation using cold MeOH. Results obtained from this polymerization are shown in Table 4, entry 2 below.

Before the full conversion of PA, $^1$H NMR spectroscopy only showed signals for perfectly alternating polyester (PCHPE) and residual rac-DL. Once the PA was consumed, as confirmed by $^1$H NMR spectroscopy, and in the presence of excess CHO, the reaction entered the second phase whereby rac-DL ROP occurred leading to triblock polyester formation. Results obtained from this polymerization are shown in Table 4, entry 2 below.

TABLE 4

| # | Monomer combination | $M_{nexp}$ of the first aliquot (Đ) | $M_{nexp}$(Đ) |
|---|---|---|---|
| 1 | PA/vCHO/ε-DL | 4.2 (1.32) | 12.8 (1.34) |
| 2 | PA/CHO/rac-LA | 2.5 (1.16) | 6.0 (1.53) |

Example 4: Synthesis of [PDL-b-PCHPE-b-PDL]$_n$ Multi-Block Copolyesters

Triblock copolyesters synthesized according to example 1 were chain extended to reach higher molecular weight (MW), according to the typical synthesis below. This resulted in the formation of multi-block copolyesters [PDL-b-PCHPE-b-PDL]$_n$ with urethane linkages.

Typically, PDL-b-PCHPE-b-PDL triblock copolyester (3000.0 mg, 1.35×10$^{-2}$ mmol), Sn(Oct)$_2$ (24.0 μL, 4.73× 10$^{-2}$ mmol) and 4,4'-Methylenebis(phenyl isocyanate) (37.0 mg, 1.48×10$^{-2}$ mmol) were dissolved in toluene (20 mL) under N$_2$ protection, in a schlenk tube charged with a stir bar. The mixture was then heated to 60° C. and left to react, under an inert atmosphere, for 2.0 h. Pure multi-block copolyester was obtained by precipitating using MeOH.

As shown in Table 5, the MWs are approximately doubled in all three samples, while the molecular weight distribution remains below 1.5. This observation suggests the successful chain extension in all three samples. SAXS was employed to characterized the phase-separated structure of the [PDL-b-PCHPE-b-PDL]$_n$ multi-block copolyesters. Strong and sharp scattering peaks were observed in all three samples, confirming the nanophase separation structures. The 2θ of peaks for #1 #3 were identified to be 0.605°, 0.705° and 0.605°, respectively. Therefore, the size of the separated phases were calculated to be 14.6 nm, 12.4 nm and 13.9 nm, respectively.

TABLE 5

Chain extension reaction of the triblock copolyesters using MDI.

| # | [PA]:[ε-DL] | wt % PCHPE | $M_{n theo}$ (kDa)[a] | $M_{n exp}$ (kDa)[b] | Đ | $M_n$ (kDa) after chain extension (Đ)[c] | $T_g$ (° C.)[d] |
|---|---|---|---|---|---|---|---|
| 1 | 50:250 | 26 | 47.2 | 34.6 | 1.19 | 56.6 (1.32) | −53 |
| 2 | 50:100 | 42 | 29.3 | 22.3 | 1.22 | 44.8 (1.47) | −49; 57 |
| 3 | 50:50 | 59 | 20.8 | 19.4 | 1.21 | 48.1 (1.50) | −47; 61 |

[a]Determined by {([PA] + [CHO]) × (conversion of PA) + [ε-DL] × (conversion of ε-DL)}/[CHD];
[b]Determined by SEC calibrated using narrow MW polystyrene standards;
[c]Chain extension reaction was catalyzed by Sn(Oct)$_2$ with MDI as the chain extension agent at 60° C.;
[d]determined by DSC.

Example 5: Penta/Heptablock Copolyester: (PDL-b)-PCHPE-b-PDL-b-PCHPE-b-PDL-b-PCHPE-(b-PDL)

The block number of the block copolyesters is not limited to triblock. Block copolyesters with higher block number (such pentablock, heptablock, etc.) can also be prepared via a sequential addition method.

Typically, pentablock block copolyester (Table 6, entry 3) is synthesized according to the following procedure. Complex 1 (10.0 mg, 1.25×10$^{-2}$ mmol), phthalic anhydride (186.0 mg, 1.26 mmol), ε-DL (410.0 μL, 2.52 mmol) and a stock solution of CHD (116.0 μL; 24.0 mg·mL$^{-1}$ in CHO) were dissolved in CHO (884.0 μL, 8.91 mmol), under N$_2$ protection, in an ampoule charged with a stir bar. The mixture was then heated to 100° C. and left to react, under an inert atmosphere, for 4.0 h to reach the full conversion of phthalic anhydride and ε-DL. Then additional phthalic anhydride (93.0 mg, 6.3×10$^{-1}$ mmol) was added into the ampoule under N$_2$ flow. The mixture was allowed to react for another 2.0 h under N$_2$ protection at 100° C. The relative molar ratio of [1]/[CHD]/[CHO]/[PA]/[ε-DL]/[PA(2$^{nd}$addition)] was 1/2/800/100/200/50. The polymerization was terminated by cooling down to ambient temperature. The crude polymer was isolated by removal of the excess volatiles (CHO). Purified polyesters can also be obtained by precipitation using cold MeOH.

Typically, heptablock block copolyester (Table 6, entry 4) is synthesized according to the following procedure. Complex 1 (10.0 mg, 1.25×10$^{-2}$ mmol), phthalic anhydride (186.0 mg, 1.26 mmol), ε-DL (325.0 μL, 1.88 mmol) and a stock solution of CHD (116.0 μL; 24.0 mg·mL$^{-1}$ in CHO) were dissolved in CHO (884.0 μL, 8.91 mmol), under N$_2$ protection, in an ampoule charged with a stir bar. The mixture was then heated to 100° C. and left to react, under an inert atmosphere, for 4.0 h to reach the full conversion of phthalic anhydride and ε-DL. Then additional phthalic anhydride (93.0 mg, 6.3×10$^{-1}$ mmol) and ε-DL (410.0 μL, 2.52 mmol) was added into the ampoule under N$_2$ flow. The mixture was allowed to react for another 3.0 h under N$_2$ protection at 100° C. The relative molar ratio of [1]/[CHD]/[CHO]/[PA]/[ε-DL]/[PA(2$^{nd}$ addition)]/[ε-DL(2$^{nd}$ addition)] was 1/2/800/100/200/50/200. The polymerization was terminated by cooling down to ambient temperature. The crude polymer was isolated by removal of the excess volatiles (CHO). Purified polyesters can also be obtained by precipitation using cold MeOH.

The same sequential addition method described above can be applied to the preparation of block copolyester with more block numbers via repeatedly sequential addition.

TABLE 6

Molecular weight of block copolyesters with different block numbers.

| # | block number | $M_{nSEC-PS}$ (Đ)[a] |
|---|---|---|
| 1 | monoblock | 5.6 (1.29) |
| 2 | triblock | 22.2 (1.26) |
| 3 | pentablock | 25.4 (1.23) |
| 4 | heptablock | 40.0 (1.31) |

[a]Determined by SEC using polystyrene calibration, with units of kg · mol$^{-1}$.

Example 6: Tensile Tests of [PDL-b-PCHPE-b-PDL]$_n$ Multi-Block Copolyesters with Different Composition Samples were prepared for tensile tests as follows. Solvent-cast polyester sheet was prepared from DCM solutions (2.2 g multi-block copolyester in 50 mL of DCM) in a Teflon mold. The solvent was slowly evaporated in a fume hood at room temperature for 2 weeks. Dumbbell-shaped sample bars were then cut out from the polyester sheet (35 mm in length, 2.1 mm in width and 0.4 mm in thickness) using a Zwick Punch (Zwick D-7900, Ulm-Einsingen Type 7102, Werk-Nr. 85688) with cutting blades. Mechanical properties including strength, elongation and Young's modulus were measured at ambient temperature and humidity (21.8° C. and 21%) on a Linkam TST350 Tensile Stress Tester instrument at 10 mm/min extension rate.

Different polyesters, such as [PDL-b-PCHPE-b-PDL]$_n$ multi-block copolyester, PDL, PCHPE homopolyester and a blend of PDL/PCHPE, were used to prepare polyester sample bars via solvent casting method in a Teflon mold. However, sample bars which are suitable for tensile test can only be made from PCHPE-b-PDL multi-block copolyester. PDL cannot sustain its shape due to its low $T_g$ and amorphous nature. PCHPE is too brittle to be taken out of the mold and breaks easily upon cutting. The blend of PDL/PCHPE exhibits the same physical status as PDL homopolyester. Therefore, only sample bars made from [PDL-b-PCHPE-b-PDL]$_n$ multi-block copolyester were suitable for the tensile test. For block copolymers with phase-separated structure, the ratio between different blocks plays a role in determining the mechanical properties. To evaluate the mechanical properties of all three samples listed in Table 5 (#1-3), tensile tests were conducted.

Figure 7:
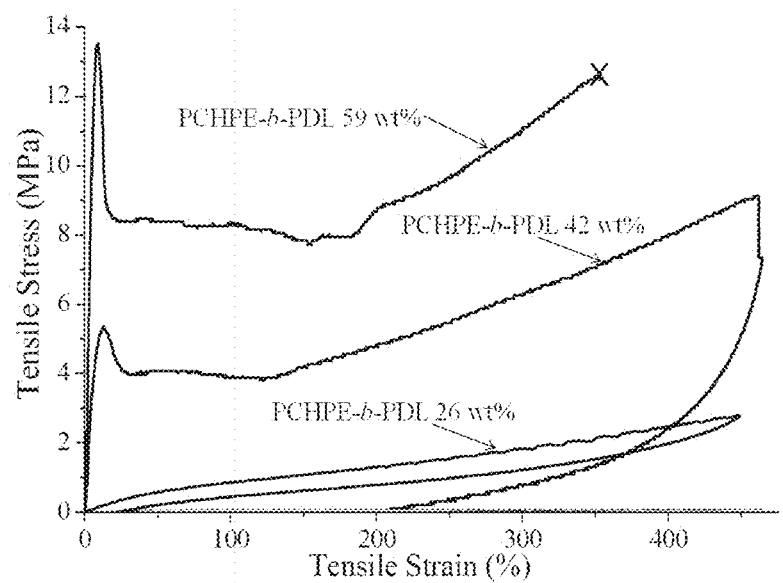
FIG. 7 shows stress-strain curves of multi-block copolyesters #1-3 in Table 4.

The strain-stress curve of #1 (with 26 wt % of PCHPE block) exhibits the same shape as an elastomer (see FIG. 7). No yield point can be observed. Also, the rather low Young's modulus (1.4 MPa) and residual strain ($\varepsilon_r$=26%) after retraction demonstrate its excellent elasticity. However, due to the limited track length of the tensile tester used for this experiment, only a 'maximum' strain of ca. 450% was recorded rather than the strain at break. On the basis of the elastomer-like behaviour, it is reasonable to assume that #1 has an island-like phase-separated structure (PDL block as the matrix).

The stress-strain curve of the #2 displays a tensile behaviour similar to plastics rather than elastomers before the strain reaches 100% (an obvious yield point and yield stage can be observed in FIG. 7). The Young's modulus was also derived from the initial slope of the stress-strain curve to be 65 MPa (one order of magnitude higher than #1) with a strain of 12% at the yield point. Interestingly, when the strain is above 100%, the material exhibits similar strain-stress behaviour as elastomers. During the following retraction test, the strain decreased to 205% after being stretched to ca. 450%. Moreover, if the sample bar was relaxed freely overnight, the residual strain can further decrease to ca. 100%. This observation reveals that #2 performs as plastics at low strain range (0~100%), while behaves similar to elastomers at high strain range (>100%). As for #1, due to the limitation of the tensile tester, the maximum strain can only be recorded as 450%. In order to roughly estimate the elongation at break, one sample bar was stretched uniaxially by hands to reach the break point and the elongation at break was recorded to be ca. 800%.

When the weight content of PCHPE reaches 59 wt % (#3), the block copolyester exhibits the mechanical properties of plastics as indicated by the stress-strain curve (see FIG. 7). A relatively high young's modulus (223 MPa) was recorded and a yield point appeared at the strain of 9%. The sample bar broke at the strain of ca. 350%, therefore no retraction test was carried out to measure the residual strain. Take the high PCHPE weight content and the plastics-like mechanical properties into account, it is reasonable to assume that #3 has an island-like phase-separated structure (PCHPE block as the matrix).

The mechanical properties of [PDL-b-PCHPE-b-PDL]$_n$ multi-block copolyesters with different compositions are summarized in Table 7 below.

| # | wt % PCHPE | Young's modulus (MPa) | ε at yield point (%) | εr (%)$^d$ | ε at break (%) |
|---|---|---|---|---|---|
| 1 | 26 | 1.4 | N.A.$^a$ | 26 | N.A.$^c$ |
| 2 | 42 | 64 | 12 | 205 | N.A.$^c$ |
| 3 | 59 | 223 | 9 | N.A.$^b$ | 350 |

$^a$no yield point was observed in this sample;
$^b$retraction test was not carried out due to the breakage at 350%;
$^c$the track of the tensile tester used for this experiment was not long enough to break the samples;
$^d$residual strains were obtained via the retraction test after reaching the strain of 450%.

Figure 8:
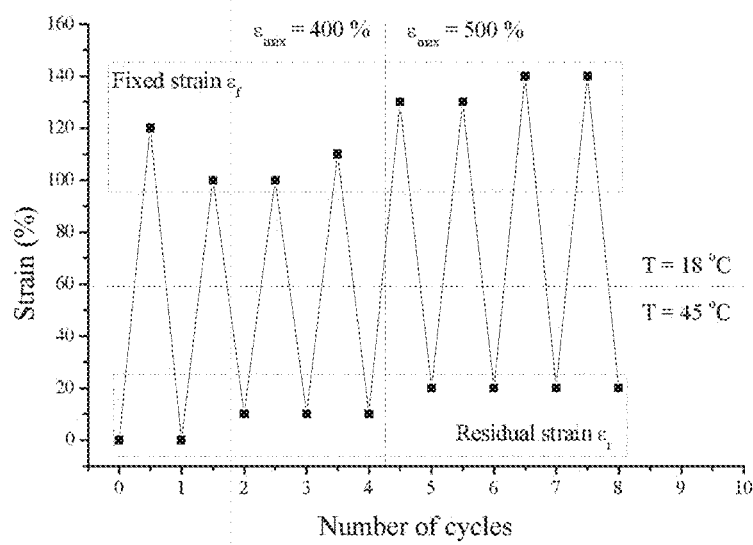
FIG. 8 shows strain recovery repeatability after different maximum strains (400% and 500%) upon heating to 45° C. and subsequent cooling to 18° C.
Figure 9:
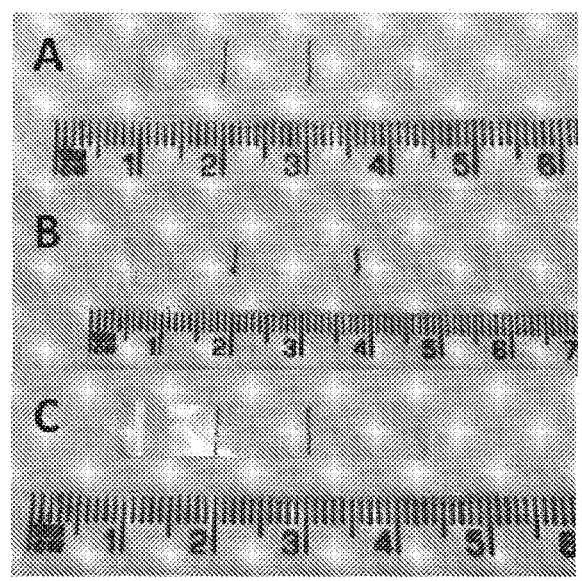
FIG. 9 shows uniaxial reversible shape transformations were observed during the cold-draw deformation at 18° C. (from A to B) and subsequent heating (45° C.)/cooling (18° C.) cycle (from B to C).

An unusual shape-memory effect was observed during the mechanical test of #2, which has the potential for biomedical applications, such as self-tightening knots, etc. The shape-memory effect of the [PDL-b-PCHPE-b-PDL]$_n$ multi-block copolyester was characterized by repeatedly stretch the specimen to the strains of 400 or 500% at ambient temperature (18° C.), which is below the T$_g$ of the hard segment (ca. 55° C.). After reaching the predetermined maximum strain, the specimen was left to relax freely at ambient temperature for 30 min to get a constant strain ($\varepsilon_c$). After that, the specimen was placed on a heating plate (45° C.) for 30 s followed by cooling to ambient temperature. FIG. 8 demonstrates the eight consecutive thermomechanical cycles (for the cycles 1-4, the maximum strain is 400%, while for the cycles 5-8, the maximum strain is 500%). A residual strain (see experimental section for the definition) over 100% can be achieved after being stretched to ε=400% and a maximum residual strain of 140% was observed after being stretched to 500%. This residual strain value is impressive, especially considering that the deformation was conducted via the cold-drawing method while high strain residual values are normally achieved by stretching specimens at a temperature above transition temperature, followed by cooling the specimens to low temperature (e.g. −20° C.) to fix the chain movement. Also, the specimen exhibited excellent strain recovery capability (>96) after being heated to 45° C. (the shape memory effect was also recorded by photos shown in FIG. 9).

Figure 10:
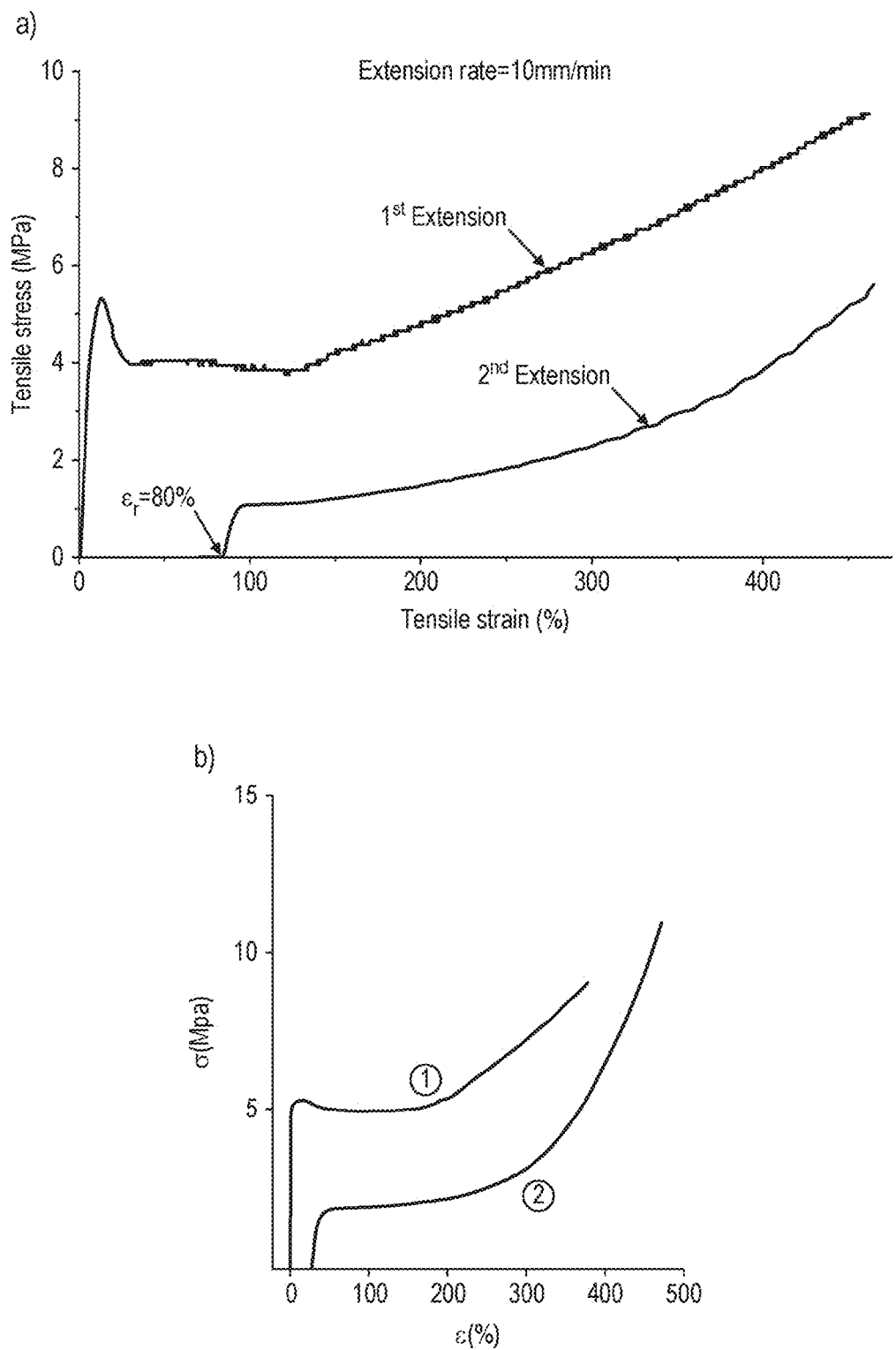
FIG. 10 shows (A) Cyclic tensile stress-strain behaviour of the 42 wt % PCHPE-b-PDL multi-block copolyester. The sample bar was relaxed at room temperature (19° C.) freely to reach a constant strain before the second extension was conducted. (B) Cyclic tensile stress-strain behaviour of the SBS containing 48 wt % of polystyrene from literature.

As discussed above, #2 in Table 5 demonstrates interesting plastics-to-rubbers transition. This kind of phenomenon is quite rare and only be observed before in SBS elastomer and its derivatives, also known as the 'strain-induced plastics-to-rubbers transition'. Considering the similarity between PCHPE-b-PDL and SBS polymers (a combination of the aliphatic soft block with low T$_g$ and the aromatic hard block with high T$_g$), it is reasonable to assume that the 'strain-induced plastics-to-rubbers transition' observed in both case shares the same mechanism. Basically, instead of forming the island-like phase-separated structure, bicontinuous phase-separated nanostructure was formed. Therefore, at low strains (0~100%), the sample behaves like plastics owing to the presence of continuous PCHPE phase, during which the PCHPE continuous phase is also gradually deformed via shearing, kinking, destruction and orientation. Finally, the PCHPE continuous phase fragments into separated PCHPE domains randomly dispersed in the PDL matrix to afford rubber-like mechanical properties. To prove this hypothesis, the cyclic tensile test was conducted (see FIG. 10A). The sample bar was first stretched to the strain of 450% to fragment the PCHPE continuous phase, followed by relaxing freely at room temperature (19° C.) to reach a constant residual strain ($\varepsilon_r$=80%). Then, the sample bar was stretched again with the same extension rate. In the 2$^{nd}$ stress-strain curve, no yield point was observed and a much lower young's modulus was recorded, which matches the mechanical properties of rubber/elastomers. Also, the cyclic tensile stress-strain curve obtained from #2 is comparable with the one obtained from SBS (with 48 wt % of polystyrene) given by the literature (FIG. 10B). Therefore, the strain-induced plastics-to-rubbers transition displayed by #2 is indeed resulting from the same bicontinuous phase deformation mechanism as SBS polymers.

A platform (increasing strain with constant stress) was observed after the yield point in both stress-strain curves of #2 and #3. The presence of this platform results from a type of segment movement known as the forced high elastic deformation (or cold drawing), which has been observed in many rigid amorphous polymers. This deformation occurs when high external force is applied on the rigid amorphous polymers below T$_g$. The polymer segments are thus forced to shear, kink and re-orient. However, this deformation is not thermal dynamically favourable. So, the strain caused by the forced high elastic deformation is recoverable because the polymer segments tend to go back to the stage with lower free energy. This recovery process can either be achieved slowly below the T$_g$ of the polymer or be accelerated by heating the polymer to a temperature above T$_g$. A key factor leading to the thermoplastic elastomer property is the phase separation effect. Phase separation means that within the block copolymers or polymer blends, different block/polymer species form separated regions of each species (usually in nanoscale) rather than miscible with each other. For example, in the case of PDL-b-PCHPE-b-PDL multi-block copolyesters, PCHPE blocks form a hard region, while PDL blocks form a soft region. Given certain composition (e.g. 26 wt % of PCHPE), PCHPE hard regions disperse in the continuous soft PDL region, leading to the island-like phase separated nanostructure. The separated PCHPE hard regions act as the physical crosslinking point during mechanical tests, affording the elastomer/rubber property. However, different from chemical crosslinking point, physical crosslinking point is reversible upon heating. Thus, PDL-b-PCHPE-b-PDL multi-block copolyesters display the property of thermoplastic elastomers.

Example 7: Property Comparison with PCHPE-b-PCL

Although ε-caprolactone (ε-CL) and ε-decalactone (ε-DL) have similar chemical structure and the homopolymer of both ε-caprolactone and ε-decalactone share the same glass transition temperature, no obvious elasticity was observed in the case of PCHPE-b-PCL. This is caused by the high crystallinity of the PCL block (usually, $\chi$>40%). Therefore, considering the high $T_g$ of PCHPE (≥60° C.) and high crystallinity of PCL, both blocks in PCHPE-b-PCL can be classified as hard segments at certain temperature range (T≤−60° C. or 0° C.≤T≤60° C.) which makes the material (PCHPE-b-PCL) very brittle rather than elastic at ambient temperature (e.g. ca. 25° C.). However, owing to the 5-carbon alkyl substituent, the homopolymer of ε-DL shows much less crystallinity (usually, 0%≤$\chi$≤20%) and soft polymer chains (at the temperature higher than −60° C.) due to its low $T_g$. Therefore, different from PCHPE-b-PCL, PCHPE-b-PDL has both the hard segment (PCHPE) and the soft segment (PDL) at certain temperature range (e.g. −60° C.≤T≤120° C.) to afford the special elastomer-like mechanical properties at ambient temperature (e.g. ca. 25° C.).
Preparation of Di-Zinc Complex 2

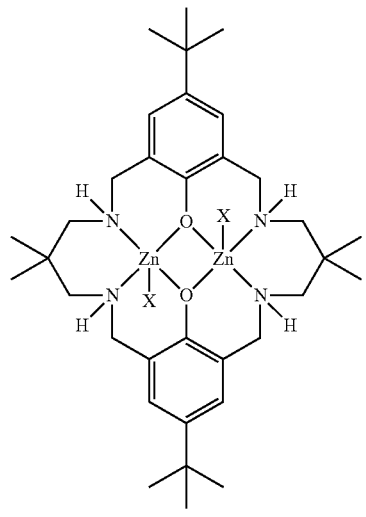

2

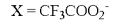

$Zn(CF_3COO)_2 \cdot xH_2O$ was dried under a vacuum at 40° C. in the presence of $P_2O_5$ for 24 h. the ligand $H_2L$ (0.80 g, 1.45 mmol) was dissolved in methanol (70 mL) and $Zn(CF_3COO)_2 \cdot xH_2O$ (0.85 g, 2.91 mmol) was added. The mixture was stirred for 18 hours and the methanol removed in vacuo. The product was taken up in dichloromethane (10 mL), filtered, and the solvent removed in vacuo. The product, a white powder, was dried under a vacuum at 40° C., in the presence of $P_2O_5$ for 10 h. White powder; yield: 0.96 g, 1.05 mmol, 74%.

$^1$H NMR (CDCl$_3$); δ 6.92 (s, 4H, Ar—H), 4.32-4.26 (m, 4H, Ar—CH$_2$—N), 3.25 (d, J=12.0 Hz, 4H, Ar—CH$_2$—N), 3.01 (m, 4H, N—CH$_2$—C), 2.68 (d, J=11.5 Hz, 4H, N—CH$_2$—C), 2.40 (t, J=12.7 Hz, 4H, NH), 1.24 (s, 18H, Ar—CH$_3$), 1.18 (s, 6H, N—C—CH$_3$), 1.03 (s, 6H, N—C—CH$_3$) EA: calculated for C$_{38}$H$_{54}$F$_6$N$_4$O$_6$Zn$_2$: C 50.29, H 6.00, N 6.17; Found: C 45.64, H 6.76, N 5.24 calculated for C$_{38}$H$_{54}$F$_6$N$_4$O$_6$Zn$_2$.5H$_2$O: C 46.75, H 6.47, N 5.62.

Example 8: Sequence Controlled Chemoselective Terpolymerization of CO$_2$/CHO/ε-DL Using Complex 2 to Afford PDL-b-PCHC-b-PDL Triblock Copolymers with 31 wt % of PCHC Complex 2 (0.02 g, 0.04 mmol), CHO (4.57 mL, 48 mmol) and ε-DL (1.72 mL, 8.8 mmol) were placed in a Schlenk tube, charged with a stirrer bar, under nitrogen. The relative molar ratios of [2]:[CHO]:[ε-DL] were 1:2000:200. The reaction mixture was de-gassed and then heated to 80° C. at 1 bar CO$_2$ pressure. After the allotted time, the CO$_2$ was removed by six vacuum/nitrogen cycles. The reaction was monitored by $^1$H NMR spectroscopy and when the ring opening polymerisation had reached ~70%, the crude reaction mixture was exposed to air and a $^1$H NMR spectrum of the crude mixture was recorded. The CHO was removed, under vacuum, and the polymer was purified by precipitation of a THF solution into methanol. Results obtained from this polymerization are shown in Table 8, entry 1 below.

Example 9: Sequence Controlled Chemoselective Terpolymerization of CO$_2$/CHO/ε-DL Using Complex 2 to Afford PDL-b-PCHC-b-PDL Triblock Copolymers with 50 wt % of PCHC Complex 2 (0.02 g, 0.04 mmol), CHO (4.57 mL, 48 mmol) and ε-DL (0.86 mL, 4.4 mmol) were placed in a Schlenk tube, charged with a stirrer bar, under nitrogen. The relative molar ratios of [2]:[CHO]:[ε-DL] were 1:2000:100. The reaction mixture was de-gassed and then heated to 80° C. at 1 bar CO$_2$ pressure. After the allotted time, the CO$_2$ was removed by six vacuum/nitrogen cycles. The reaction was monitored by $^1$H NMR spectroscopy and when the ring opening polymerisation had reached ~70%, the crude reaction mixture was exposed to air and a $^1$H NMR spectrum of the crude mixture was recorded. The CHO was removed, under vacuum, and the polymer was purified by precipitation of a THF solution into methanol. Results obtained from this polymerization are shown in Table 8, entry 2 below.

TABLE 8

| # | [CHO]:[ε-DL][a] | % PCHC[b] | $M_{ntheo}$[c] | $M_{nexp}$[d] | Đ[d] | $T_g$/° C.[e] |
|---|---|---|---|---|---|---|
| 1 | 2000:200 | 1:2.2 | 15,900 | 6829 | 1.45 | 48 |
| 2 | 2000:200 | 1:1 | 27,700 | 7917 | 1.37 | — |

[a]Molar equivalent of monomers to catalysts;
[b]weight ratio of the PCHC block to PDL block, calculated based on the $^1$H NMR spectra;
[c]theoretical molecular weight calculated according to the conversion of the monomers;
[d]experimental molecular weight and molecular weight distribution obtained from the SEC characterization;
[e]obtained from DSC characterization.

Figure 11:
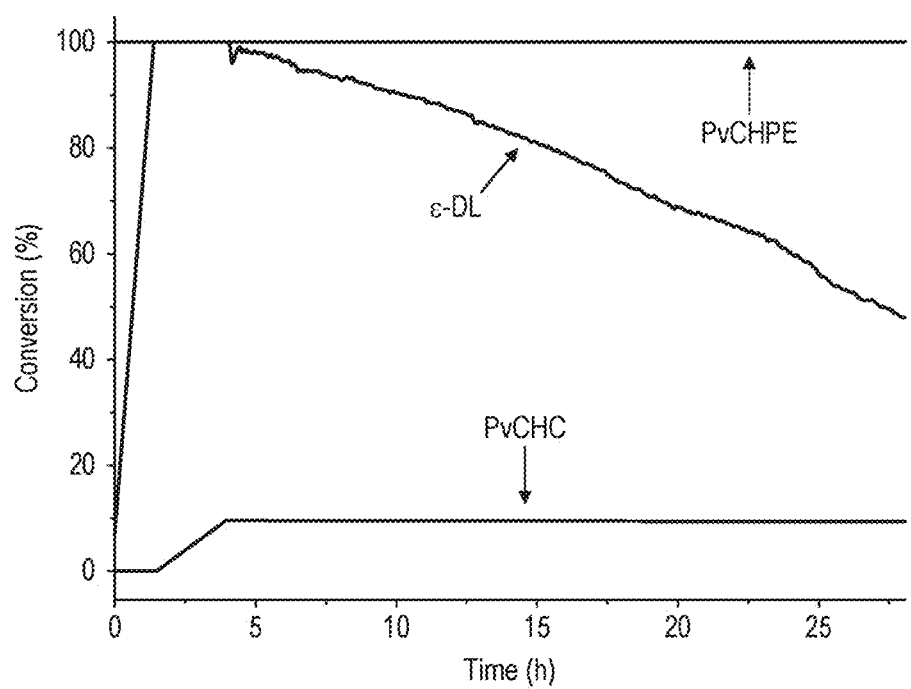
FIG. 11 shows an ATR-IR spectrum acquired during PDL-b-PvCHC-b-PCHPE-b-PvCHC-b-PDL pentablock copolymer formation.

Example 10: Sequence Controlled Chemoselective Terpolymerization of CO$_2$/PA/vCHO/ε-DL Using Complex 1 to Afford PDL-b-PvCHC-b-PCHPE-b-PvCHC-b-PDL Pentablock Copolymers Complex 1 (0.01 g, 0.012 mmol), PA (0.08 g, 0.57 mmol), ε-DL (0.86 mL, 4.6 mmol) and a stock solution of CHD (55.0 μL; 50 mg/mL in CHO) were dissolved in CHO (2.51 mL, 17.8 mmol), under nitrogen, in a Schlenk tube, charged with a stir bar. The relative molar ratios of [1]/[CHD]/[PA]/[VCHO]/[ε-DL] were 1/2/50/1550/400. The schlenk tube was then charged with 1 atm of CO$_2$. The solution was heated to 100° C. Aliquots for $^1$H NMR were taken during the polymerisation. After the allotted time, the atmosphere was changed to nitrogen using short N$_2$/vacuum cycles. After the allotted reaction time, the polymerization was terminated by cooling down to ambient temperature a $^1$H NMR spectrum of the crude mixture was recorded. The vCHO was removed, under vacuum, and the polymer was purified by precipitation of a THF solution into methanol. Results obtained from this polymerization are shown in Table 9, entry 1 below. The reaction of LZn$_2$Ph$_2$/CHD with CO$_2$/PA/vCHO/ε-DL was also monitored by in-situ ATR-IR spectroscopy (see FIG. 11).

TABLE 9

| # | Monomers | TOF PE | TOF PC | TOF PL | M$_n$ PE | M$_n$ PC | M$_n$ PL | PE:PC:PL exp | T$_g$ ° C. |
|---|---|---|---|---|---|---|---|---|---|
| 1 | PA:VCHO:ε-DL 50:1550:200 | 38.5 | 51.6 | 7.2 | 804 (1.06) | 1487 (1.15) | 1953 (1.19) | 1:3:5 | −51 |

The invention claimed is:

1. A multi-block copolymer comprising blocks A-B-A, wherein block A comprises a polyester formed by polymerisation of ε-decalactone; and block B comprises a copolyester formed by polymerisation of (1) cyclohexene oxide or 4-vinyl-1-cyclohexene-1,2-epoxide and (2) phthalic anhydride, wherein the multi-block copolymer is a triblock copolyester, a pentablock copolyester, or a heptablock copolyester, and wherein the multi-block copolymer comprises urethane linkages.

2. The multi-block copolymer of claim 1, wherein the copolymer has a measureable T$_g$ for each of blocks A and B, with a difference of at least 10° C. between the T$_g$ for blocks A and B.

3. The multi-block copolymer of claim 1, wherein block B has a T$_g$ of ≥30° C., and no more than 250° C.

4. The multi-block copolymer of claim 1, wherein the multi-block copolymer is characterised by feature (i) or (ii) and feature (iii):
   (i) a degree of crystallinity (x) of block A of no more than 20% as determined by DSC; and/or
   (ii) a degree of crystallinity (x) of block A of no more than 20% as determined by WAXS; and/or
   (iii) a measureable T$_g$ for each of blocks A and B, with a difference of at least 10° C. between the T$_g$ for blocks A and B.

5. The multi-block copolymer of claim 1, wherein, the weight content of block B, with reference to block A, is from 10 to 90%.

6. The multi-block copolymer of claim 1, having a M$_n$ (number average molecular weight) of at least 1 kg/mol.

7. The multi-block copolymer of claim 1, having a Young's modulus of 1 MPa to 7000 MPa.

8. The multi-block copolymer of claim 1, wherein block B comprises a copolyester formed by polymerisation of (1) cyclohexene oxide and (2) phthalic anhydride.

9. The multi-block copolymer of claim 1, wherein Block B comprises poly(cyclohexylene phthalic)ester, an alternating copolyester formed from polymerization of cyclohexene oxide and phthalic anhydride.

10. A packaging material, a biomedical material, a sealant, an adhesive, an engineering material, a synthetic fibre, an automobile part or a foam comprising a copolymer according to claim 1.

11. The multi-block copolymer of claim 5, wherein the weight content of block B, with reference to block A, is from 20 to 80%.

12. The multi-block copolymer of claim 5, wherein the weight content of block B, with reference to block A, is from 30 to 55%.

13. The multi-block copolymer of claim 1, wherein block B comprises a copolyester formed by polymerisation of (1) 4-vinyl-1-cyclohexene-1,2-epoxide and (2) phthalic anhydride.

14. The multi-block copolymer of claim 2, wherein the copolymer has a measureable T$_g$ for each of blocks A and B, with a difference of at least 100° C. between the T$_g$ for blocks A and B.

15. The multi-block copolymer of claim 1, wherein block B of the multiblock copolymer is amorphous.

16. The multi-block copolymer of claim 1, characterised by one or more of features (i) to (ii):
   (i) a degree of crystallinity (x) of block A of no more than 20% as determined by DSC; and/or
   (ii) a degree of crystallinity (x) of block A of no more than 20% as determined by WAXS.

17. The multi-block copolymer of claim 1, formed from a catalytic system comprising 1,2-cyclohexane diol and a catalyst of the formula:

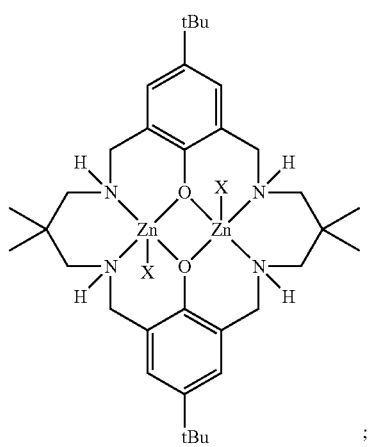

wherein each X is phenyl.

18. The multi-block copolymer of claim 7, having a Young's modulus of 50 MPa to 7000 MPa.

\* \* \* \* \*